United States Patent
Bosshart et al.

(10) Patent No.: US 10,454,833 B1
(45) Date of Patent: Oct. 22, 2019

(54) PIPELINE CHAINING

(71) Applicant: Barefoot Networks, Inc., Santa Clara, CA (US)

(72) Inventors: Patrick Bosshart, Plano, TX (US); Jay Evan Scott Peterson, San Francisco, CA (US); Michael Gregory Ferrara, Palo Alto, CA (US); Remy Chang, Milpitas, CA (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 0 days.

(21) Appl. No.: 15/838,697

(22) Filed: Dec. 12, 2017

Related U.S. Application Data

(60) Provisional application No. 62/527,637, filed on Jun. 30, 2017.

(51) Int. Cl.
*H04L 12/801* (2013.01)
*G06Q 40/04* (2012.01)
*H04L 12/761* (2013.01)

(52) U.S. Cl.
CPC ............. *H04L 47/15* (2013.01); *G06Q 40/04* (2013.01); *H04L 45/16* (2013.01)

(58) Field of Classification Search
CPC .......... H04L 47/15; H04L 45/16; G06Q 40/04
See application file for complete search history.

(56) References Cited

U.S. PATENT DOCUMENTS

| | | | |
|---|---|---|---|
| 8,279,871 B1 | 10/2012 | Sivan et al. | |
| 8,595,104 B2 | 11/2013 | Parsons et al. | |
| 8,976,791 B1 | 3/2015 | Sivan et al. | |
| 9,509,639 B1 | 11/2016 | Kadosh et al. | |
| 2005/0147095 A1 | 7/2005 | Guerrero et al. | |
| 2007/0195761 A1* | 8/2007 | Tatar | H04L 49/1546 370/389 |
| 2010/0088756 A1 | 4/2010 | Balakrishnan et al. | |

OTHER PUBLICATIONS

Non-published commonly owned U.S. Appl. No. 15/838,701, filed Dec. 12, 2017, 52 pages, Barefoot Networks, Inc.

* cited by examiner

*Primary Examiner* — Dady Chery
(74) *Attorney, Agent, or Firm* — Adeli LLP

(57) ABSTRACT

Some embodiments provide a network forwarding integrated circuit (IC) for processing network packets. The network forwarding IC includes multiple packet processing pipelines and a traffic management unit. Each pipeline is configured to operate as an ingress pipeline and an egress pipeline. The traffic management unit is configured to receive a packet processed by an ingress pipeline and to enqueue the packet for output to a particular egress pipeline. A set of packets received by the network forwarding IC are processed by a first pipeline as an ingress pipeline and a second pipeline as an egress pipeline, then subsequently processed by the second pipeline as an ingress pipeline and a third pipeline as an egress pipeline.

19 Claims, 16 Drawing Sheets

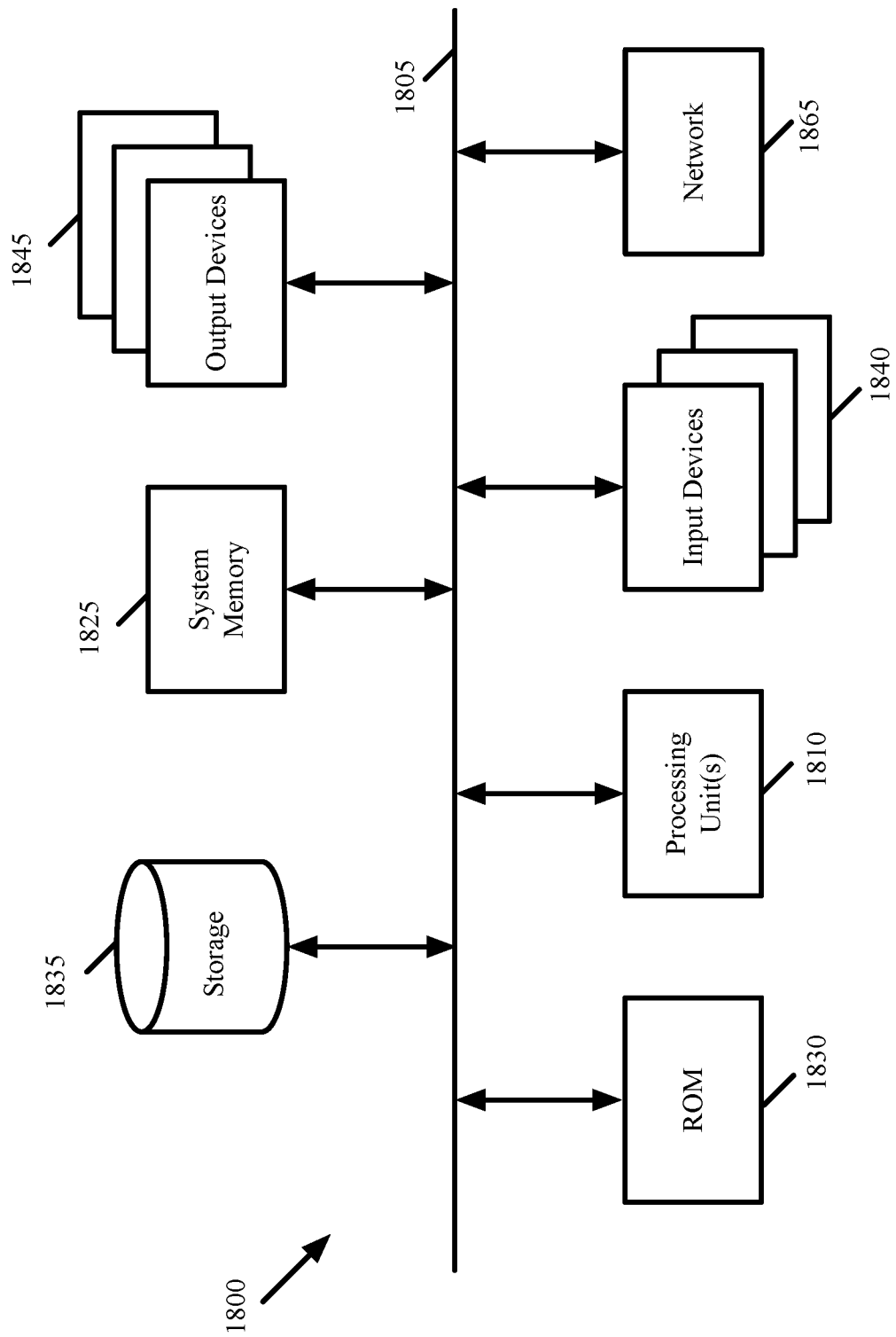

PIPELINE CHAINING

BACKGROUND

For certain applications, a forwarding element (i.e., a switch, router, etc.) may receive packets that need to be forwarded to different destinations, because the different destinations will have process the data contained in the packets. One such application is high-frequency trading, in which high-performance servers analyze market data packets (that indicate, e.g., changes in a particular stock price) and make decisions about when to buy or sell shares of stocks based on this data. In some cases, market data packets may include data on multiple different stocks, only a subset of which are analyzed by a particular server. In addition, a server may receive market data packets that only contain data not processed by that server. One source of inefficiency for these servers comes from identifying the useful data from the unnecessary data.

BRIEF SUMMARY

Some embodiments of the invention provide a hardware forwarding element configured to identify one or more sections of a packet payload and, for each packet payload section, identify a set of destinations. The forwarding element replicates the packet for each identified destination (assuming there is more than one), and to each destination sends a new packet that includes (i) a set of packet headers of the original packet and (ii) the payload section for the destination. Each new packet only includes its particular payload section, with the other payload sections removed from the new packet sent to the particular destination.

In some embodiments, the packets are market data packets (e.g., providing stock market data), with the payload separated into sections by stock ticker symbols indicating corporations. That is, a packet received by the forwarding element includes packet headers (e.g., layer 2, layer 3, etc. headers) and one or more sections of payload data. Each section includes a symbol (e.g., the stock ticker symbol) and data about the corporation represented by the symbol (e.g., the stock price or other data about the corporation). Each output packet then includes at least a subset of the packet headers and a smaller payload that only includes one payload section relating to a single company. In some of these embodiments, the output packets are sent to servers that process the market data to perform high-frequency trading. In some embodiments, each server processes data for a single corporation or for a limited set of corporations (e.g., one server might separately process data for more than one corporation). In such embodiments, isolating the market data for that corporation or corporations allows the server to more quickly process the data without the need to parse out the relevant data.

In some cases, some of the payload sections will not be sent to any of the destinations. For example, if a particular section provides information about a stock that is not processed by any of the local network servers, this section can be dropped. In addition, some embodiments use additional queries, such as using the share prices or share amounts. Different embodiments may use a threshold or range to identify whether to forward a packet data section to a server that processes data for the stock symbol in the packet data section.

The hardware forwarding element of some embodiments includes a set of configurable packet processing pipelines that operate as both ingress pipelines (for packets received at the forwarding element) and egress pipelines (for packets being sent from the forwarding element), in addition to a traffic management unit that is responsible for receiving packets from an ingress pipeline and enqueuing the packet for a port associated with an egress pipeline. Typically, a packet is processed by one ingress pipeline, enqueued by the traffic management unit (which may also perform packet replication, if necessary), and processed by one egress pipeline. Each packet processing pipeline (whether acting as an ingress or egress pipeline) includes a parser, a match-action unit (a series of match-action stages), and a deparser. The parser receives a packet as an ordered stream of data, and based on its instructions and analysis of the packet, identifies packet header fields and stores the packet header fields in a set of data containers to be sent to the match-action unit. In some embodiments, the parser stores a first set of packet header fields in a primary set of data containers (referred to as a primary packet header vector (PHV)) and stores a second set of packet header fields in a secondary set of data containers (referred to as a secondary PHV). Only the primary PHV is sent to the match-action stages, which match on the PHV values and perform actions which may include modifying one or more of the packet header field values stored in the primary PHV, storing additional information for the packet in the primary PHV, etc. After the last match-action stage, the primary and secondary PHVs are provided to the deparser, so that the deparser can reconstruct the packet.

To accomplish the splitting of packets into multiple payload sections, in some embodiments the ingress parser identifies the payload sections and provides this data to the match-action unit with the primary PHV. Specifically, the ingress pipeline parser identifies that the packet is a particular type of packet (e.g., a market data packet) based on the packet headers (e.g., layer 2 and/or layer 3 headers). Based on this initial identification, the parser is configured to identify the multiple payload sections of the packet and store each of these in separate data containers of the primary PHV. For example, for market data packets, the parser identifies each stock ticker symbol and stores this with its subsequent related stock data in a PHV container (or containers, depending on the size of the stock data).

The match-action unit, at one (or more) of its match-action stages, matches the payload sections in the primary PHV against a table of possible payload section types. For example, the table of some embodiments includes entries for each possible stock symbol that corresponds to one or more destinations on a local network (e.g., servers for making high-frequency trading decisions for that particular stock). Some embodiments generate a bitmap indicating which of the possible symbols are found in the packet. As mentioned, each payload section will be sent to one or more destinations, and the match-action unit translates the bitmap into a multicast group identifier that is stored with the PHV and eventually sent to the traffic management unit. In some cases, some of the payload sections will not be sent to any of the destinations (e.g., if a particular section provides information about a stock that is not processed by any of the local network servers).

The traffic management unit of some embodiments, as mentioned, handles packet replication as well as directing packets to the correct egress port. The traffic management unit stores a table of multicast group identifiers and the destinations and output ports for each multicast group. Thus, for a packet with multiple payload sections for different destinations, the traffic management unit replicates the packet a number of times specified by the table for the multicast group identifier received with the packet, and enqueues each of these replicated copies of the packet into the correct egress port (with each pipeline having multiple egress ports).

When each packet copy is released from its queue to an egress pipeline, the egress pipeline generates the new packet to be sent to the corresponding destination. For each packet copy headed to a particular destination, the egress pipeline also receives an identifier that corresponds to the payload section type (e.g., the stock symbol) processed by that destination. Based on this identifier, the egress pipeline generates a new packet with only the packet headers of the original packet (or a subset of the packet headers, with destination addresses tailored to the packet destination) and the specific payload section corresponding to the identifier. That is, the egress pipeline removes the other payload sections that are not processed by the destination, which minimizes the extraneous processing required by the destination to isolate its desired information.

Some other embodiments, rather than using the process described above to replicate different payload sections of a packet to different destinations, use a process referred to herein as pipeline chaining. As mentioned, each physical packet processing pipeline in some embodiments is configured to operate as both an ingress pipeline and an egress pipeline. Packets generally are processed by a first pipeline as an ingress pipeline and a second pipeline as an egress pipeline. The second pipeline may be the same pipeline as the first pipeline or a different pipeline from the first pipeline.

For certain packets, however, the hardware forwarding element of some embodiments processes the packets through multiple ingress pipelines and multiple egress pipelines. As an example, a particular packet might be processed by a first pipeline as an ingress pipeline, enqueued by the traffic management unit for and subsequently processed by a second pipeline as an egress pipeline, then looped back to the second pipeline as an ingress pipeline and enqueued by the traffic management unit for and subsequently processed by a third pipeline (which may be the same as or different from the first pipeline) as an egress pipeline. Similarly, additional loopbacks and ingress/egress pipeline pairs may be used. This pipeline chaining allows the standard overhead of packet processing to be primarily contained to the initial ingress and final egress pipelines, with the internal pipelines able to perform more complex processing or use larger tables than are available for a single ingress/egress pair. For example, in some embodiments, large tables (e.g., longest-prefix-matching for IP routes or access control lists) are spread across multiple pipelines. In other embodiments, multiple complex processes can be performed in the different pipelines (e.g., longest-prefix-matching in a first pipeline, access control lists in a second pipeline, tunneling/encapsulation in a third pipeline, etc.).

In addition, some embodiments use pipeline chaining to replicate different sections of a packet payload to different destinations. In such embodiments, rather than having the ingress pipeline parser identify a packet as a packet with multiple payload sections to be replicated, this task is performed by the match-action unit of the first ingress pipeline. Specifically, in addition to performing standard overhead packet processing (e.g., layer 2 and layer 3 processing), the first ingress pipeline (i.e., a first pipeline acting as an ingress pipeline) match-action unit identifies the packet as a market data packet, and passes this information with the packet to the traffic management unit. In addition, the initial ingress pipeline removes the packet headers (e.g., the layer 2 and layer 3 headers) before sending the packet to the traffic management unit (e.g., the deparser does not include this data in the output packet).

At this point, the specific payload sections present in the packet (and thus the destinations for the packet data) are not known. The traffic management unit of some embodiments replicates the packet to multiple ports of an initial egress pipeline (e.g., a second pipeline acting as an egress pipeline). Some embodiments replicate the packet to all of the ports (e.g., 16 ports), while other embodiments replicate the packet to a subset of the ports. In some embodiments, the initial egress pipeline operates in bypass mode, such that once dequeued from the traffic management unit the packets are sent out of the initial egress pipeline without any processing, and subsequently looped back into the same pipeline as a second ingress pipeline.

For each replicated packet copy, in some embodiments the parser of this second ingress pipeline identifies one of the payload sections and includes this in the PHV for the match-action unit. The parser identifies the first payload section for the first replicated copy, the second payload section for the second replicated copy, etc. In some embodiments, the parser is not looking for a specific symbol, but rather counting off sections so that for each packet, a different section is identified. If there are more replicated copies of the packet than payload sections, some embodiments drop the additional copies.

In some embodiments, the same physical parser circuit is used for each packet, and an identifier is incremented with each copy of the packet that specifies which payload section the parser should identify. Other embodiments, however, have a separate parser circuit for each port with which the packet is associated, and these different parsers are configured to identify a different payload section (e.g., a first parser configured to identify the first payload section, a second parser configured to identify the second payload section, etc.).

Each of these different PHVs is then sent to the match-action unit (or to a separate match-action unit) of the second ingress pipeline. The match-action unit of this ingress pipeline matches over the payload section identifier (e.g., the stock ticker symbol) and identifies a set of destinations for the payload section. That is, the match table includes entries for each possible payload section type, and the specified action entry for each of these match table entries is a set of destinations to which to send the packet. In some embodiments, the deparser for each packet copy generates a packet with only the payload section isolated for that packet, and passes this packet data along with the destination set identifier to the traffic management unit.

The traffic management unit then enqueues each of the packets in the appropriate port for their destination. In addition, if multiple copies of a particular payload section are required for multiple destinations, the traffic management unit replicates those packets for each destination. In some embodiments, some or all of these packet copies are returned to the first packet processing pipeline (that was the initial ingress pipeline), now operating as the second (and final) egress pipeline. In addition, packet copies may be sent to the same pipeline that acted as the initial egress and second ingress pipieline, or to other pipelines. The egress pipeline for each packet copy adds on the original headers (or a compressed version thereof) to the payload section remaining for that packet copy, and transmits the packet out of the forwarding element port. In reinstating the packet header, some embodiments treat the header as static, with the possible exception of the source and/or destination addresses. Thus, the packet header field values do not need to be stored for use by the eventual last egress pipeline, because this egress pipeline can use the static values for all such packets. For the destination addresses, some embodiments use those of the local destination for each packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 18 conceptually illustrates an electronic system with which some embodiments of the invention are implemented.

DETAILED DESCRIPTION

Some embodiments of the invention provide a hardware forwarding element configured to identify one or more sections of a packet payload and, for each packet payload section, identify a set of destinations. The forwarding element replicates the packet for each identified destination (assuming there is more than one), and to each destination sends a new packet that includes (i) a set of packet headers of the original packet and (ii) the payload section (or sections) for the destination. Each new packet only includes its particular payload section(s), with the other payload sections removed from the new packet sent to the particular destination.

Figure 1:
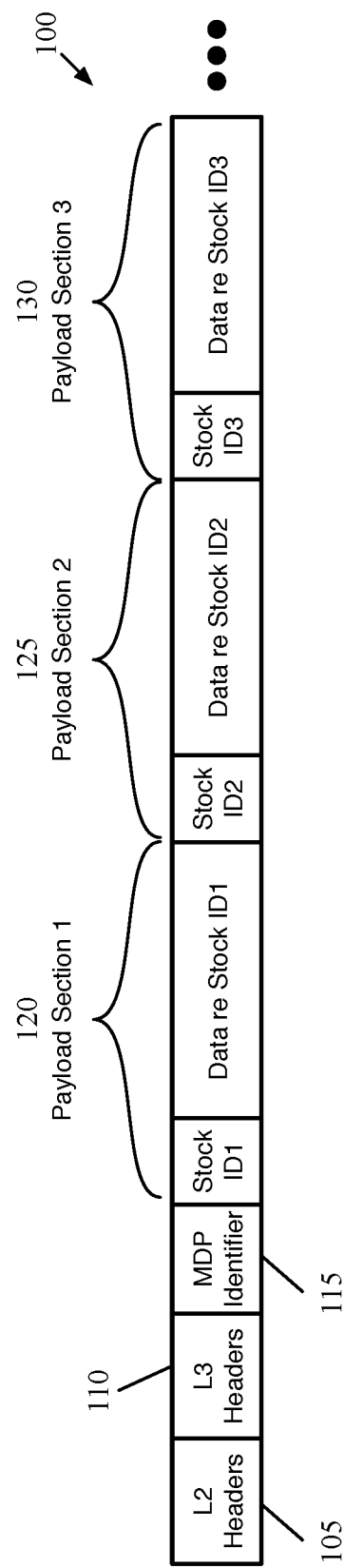
FIG. 1 conceptually illustrates an example of the structure of a market data packet that could be received by the forwarding element of some embodiments.

In some embodiments, the packets received by the forwarding element are market data packets (e.g., providing stock market data), with the payload separated into sections by stock ticker symbols indicating corporations. FIG. 1 conceptually illustrates an example of the structure of such a market data packet 100 that could be received by the forwarding element of some embodiments. The packet 100, as shown includes packet headers such as layer 2 (L2) headers 105, layer 3 (L3) headers 110, etc. (while the L2 and L3 headers are shown, other headers (e.g., layer 4 (L4) headers, encapsulation headers, etc.) may be included. The packet includes an identifier 115 that identifies the packet as a market data packet. In some embodiments, this identifier is actually part of the L3 or L4 headers (e.g., a value in the L3 protocol field), or in another header field. In addition, the packet includes several payload sections 120-130 (i.e., sections that are not part of the L2-L4 headers). Each of these payload sections 120-130 includes a stock identifier (e.g., a stock ticker symbol or representation thereof) and data regarding that stock. This data, in different embodiments, may include the current stock price, a price change, or more complex information). In some embodiments, each of the payload sections has the same format and length (i.e., the same number of bits), while in other embodiments the length of the payload sections can vary.

The forwarding element outputs packets that each includes at least a subset of the packet headers and a smaller payload that only includes one payload section relating to a single company (or, in some cases more than one payload section, if a particular destination processes data for multiple stocks). In some of these embodiments, the output packets are sent to servers that process the market data to perform high-frequency trading. In some embodiments, each server processes data for a single corporation or for a limited set of corporations (e.g., one server might separately process data for more than one corporation). In such embodiments, isolating the market data for that corporation or corporations allows the server to more quickly process the data without the need to parse out the relevant data.

In some cases, some of the payload sections will not be sent to any of the destinations. For example, if a particular section provides information about a stock that is not processed by any of the local network servers, this section can be dropped. In addition, some embodiments use additional queries, such as using the share prices or share amounts. Different embodiments may use a threshold or range to identify whether to forward a packet data section to a server that processes data for the stock symbol in the packet data section.

Figure 2:
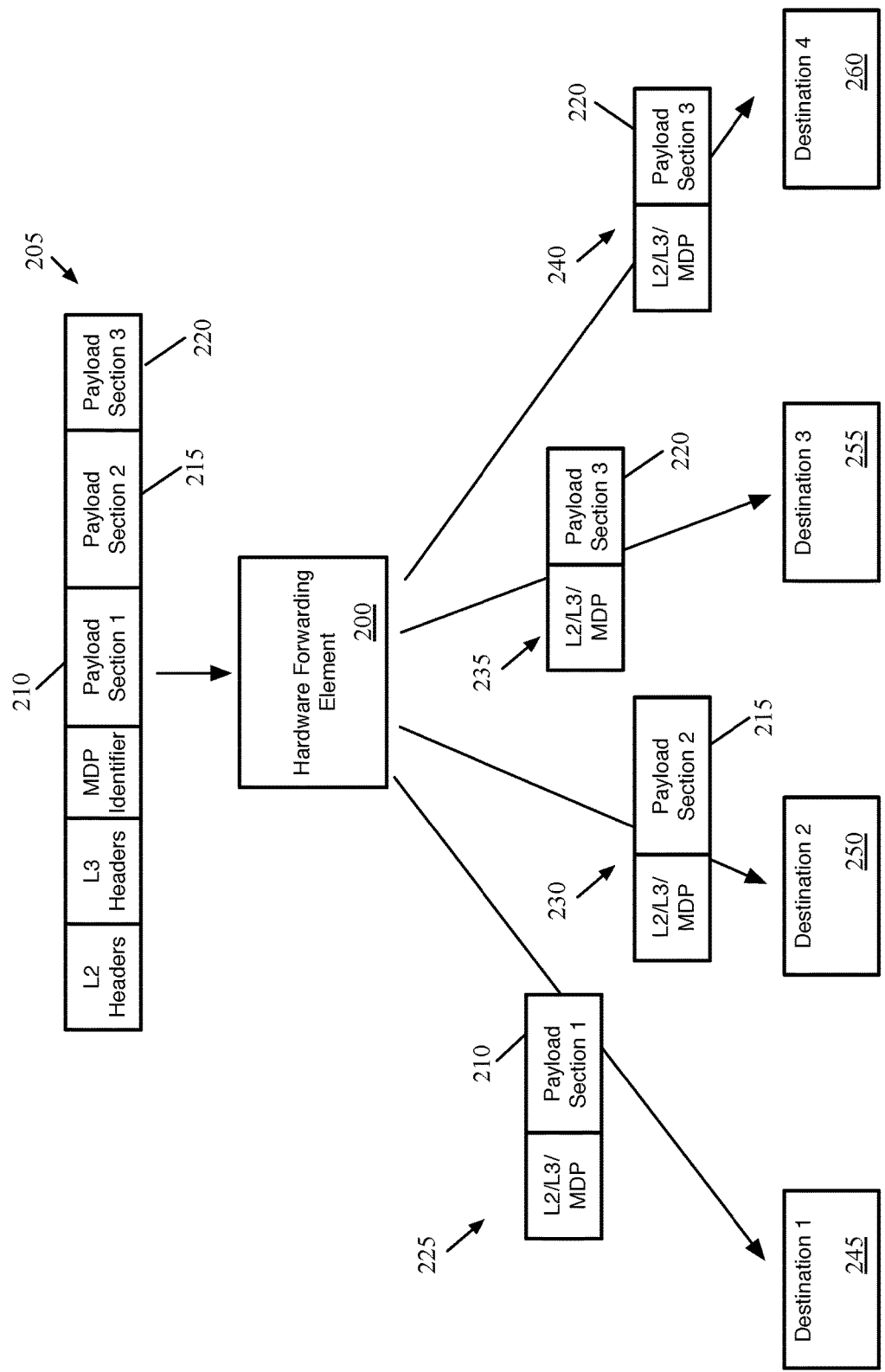
FIG. 2 illustrates an example of a hardware forwarding element that receives a market data packet with multiple payload sections and sends the different payload sections to different destinations.

FIG. 2 illustrates an example of a hardware forwarding element 200 (e.g., a forwarding element using a network forwarding integrated circuit) that receives a market data packet 205 with multiple payload sections and sends the different payload sections to different destinations. As with the packet 100, the packet 200 includes L2 headers, L3 headers, a market data packet identifier, and three payload sections 210-220. In this case, the three payload sections are different sizes. The hardware forwarding element 200 breaks this packet 205 into four smaller packets 225-240 (two of which have the same payload) for four destinations 245-260 (e.g., high-frequency trading servers).

The first packet 225 sent to the first destination 245 includes packet headers and a market data identifier as well as the first payload section 210. The headers, in different embodiments, can include all of the L2 and L3 (and/or L4) headers from the original packet 205, or a subset thereof. In addition, these headers include the header field identifying the packet 225 as a market data packet. Lastly, the packet 225 includes only the first payload section 210, without the additional payload sections 215 and 220. Similarly, the packet 230 sent to the second destination 250 includes packet headers, the market data identifier, and only the second payload section 215 without the additional payload sections 210 and 220, while the packets 235 and 240 sent to the third and fourth destinations 255 and 260, respectively, include packet headers, the market data identifier, and only the third payload section 220 without the other payload sections 210 and 215. The packets 235 and 240 may have slightly different packet headers owing, e.g., to different destination addresses. The different destinations 245-260 can then process their packets with individual payload sections more quickly.

Figure 3:
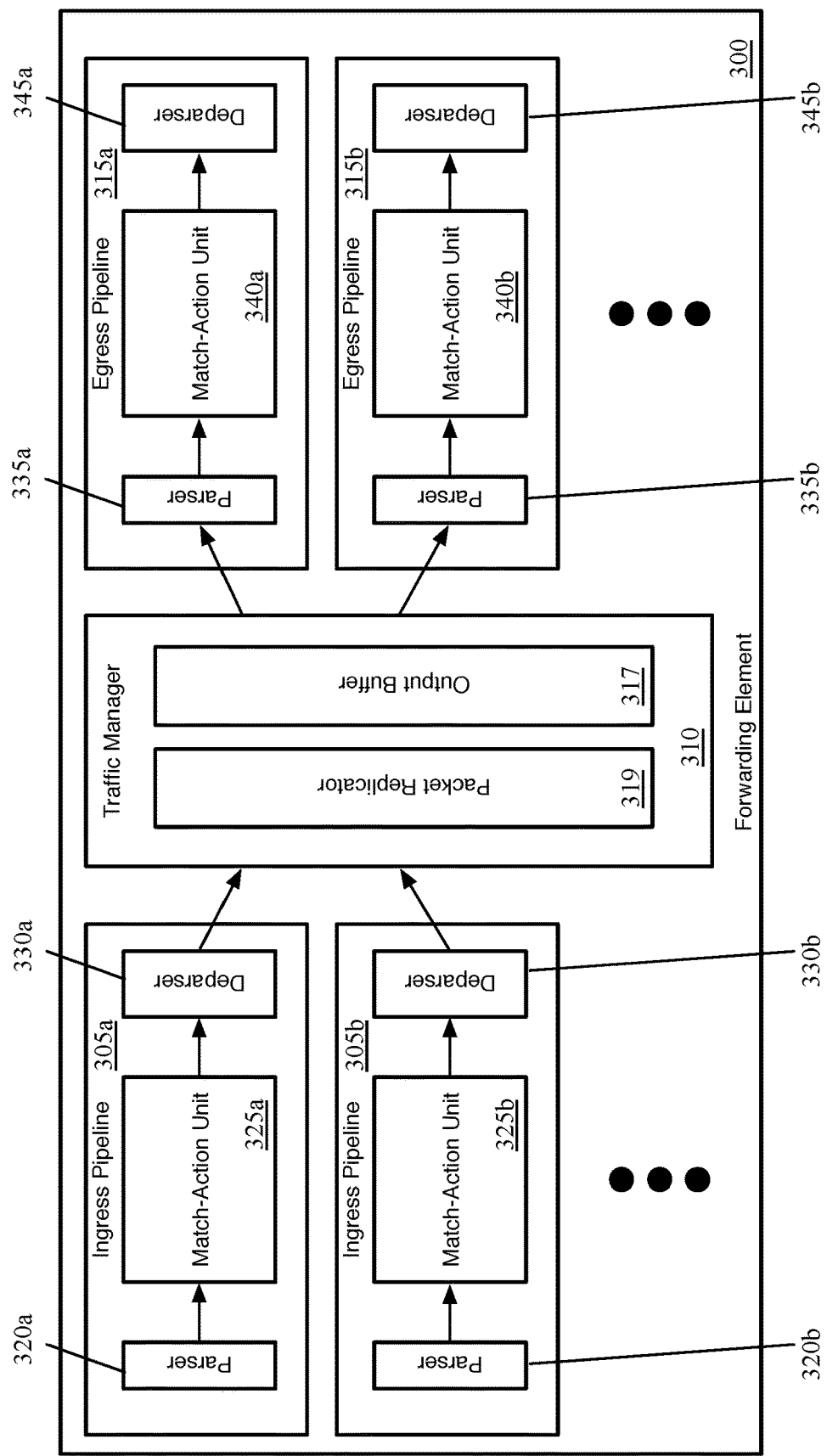
FIG. 3 conceptually illustrates the structure of a hardware forwarding element of some embodiments.

As noted, the replication and forwarding of different packet payload sections is performed by a hardware forwarding element in some embodiments (e.g., a network forwarding integrated circuit). FIG. 3 conceptually illustrates the structure of such a hardware forwarding element of some embodiments. Specifically, FIG. 3 illustrates several ingress pipelines 305, a traffic management unit (referred to as a traffic manager) 310, and several egress pipelines 315. Though shown as separate structures, in some embodiments the ingress pipelines 305 and the egress pipelines 315 actually use the same circuitry resources. In some embodiments, the pipeline circuitry is configured to handle both ingress and egress pipeline packets synchronously. That is, a particular stage of the pipeline may process both an ingress packet and an egress packet in the same clock cycle. However, in other embodiments, the ingress and egress pipelines are separate circuitry.

Generally, when the forwarding element 300 receives a packet, in some embodiments the packet is directed to one of the ingress pipelines 305 (each of which may correspond to one or more ports of the forwarding element). After passing through the selected ingress pipeline 305, the packet is sent to the traffic manager 310, where the packet is enqueued and placed in the output buffer 317. The traffic manager 310 then dispatches the packet to the appropriate egress pipeline 315 (each of which may correspond to one or more ports of the forwarding element). In some embodiments, there is no necessary correlation between which of the ingress pipelines 305 processes a packet and to which of the egress pipelines 315 the traffic manager 310 dispatches the packet. That is, a packet might be initially processed by ingress pipeline 305b after receipt through a first port, and then subsequently by egress pipeline 315a to be sent out a second port, etc. In some embodiments, the ingress pipeline specifies to the traffic manager the queue and/or port (corresponding to a particular egress pipeline) out of which the packet will be sent.

Each ingress pipeline 305 includes a parser 320, a match-action unit (MAU) 325, and a deparser 330. Similarly, each egress pipeline 315 includes a parser 335, a MAU 340, and a deparser 345. In some embodiments, each pipeline includes multiple parsers and/or multiple deparsers (e.g., one parser per port that corresponds to the pipeline). The parser 320 or 335, in some embodiments, receives a packet as a formatted collection of bits in a particular order, and parses the packet into its constituent header fields. The parser starts from the beginning of the packet and assigns these header fields to fields (e.g., data containers) of a packet header vector (PHV) for processing. In some embodiments, the parser 320 or 335 separates out the packet headers (up to a designated point) from the payload of the packet, and sends the payload (or the entire packet, including the headers and payload) directly to the deparser without passing through the MAU processing (e.g., on a single wire).

The MAU 325 or 340 performs processing on the packet data (i.e., the PHV). In some embodiments, the MAU includes a sequence of stages, with each stage including one or more match tables and an action engine. Each match table includes a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage performs the actions on the packet, which is then sent to the next stage of the MAU. The MAU stages are described in more detail below by reference to FIG. 5.

The deparser 330 or 345 reconstructs the packet using the PHV as modified by the MAU 325 or 340 and the payload received directly from the parser 320 or 335. The deparser constructs a packet that can be sent out over the physical network, or to the traffic manager 310. In some embodiments, the deparser constructs this packet based on data received along with the PHV that specifies the protocols to include in the packet header, as well as its own stored list of data container locations for each possible protocol's header fields.

The traffic manager 310, as shown, includes a packet replicator 319 and the previously-mentioned output buffer 317. In some embodiments, the traffic manager 310 may include other components, such as a feedback generator for sending signals regarding output port failures, a series of queues and schedulers for these queues, as well as additional components. The packet replicator 319 of some embodiments performs replication for broadcast/multicast packets, generating multiple packets to be added to the output buffer (e.g., to be distributed to different egress pipelines). In some embodiments, the packet replicator also performs replication in order to enable the transmission of different packet payload sections to different destinations.

The output buffer 317 is part of a queuing and buffering system of the traffic manager in some embodiments. The traffic manager 310 provides a shared buffer that accommodates any queuing delays in the egress pipelines. In some embodiments, this shared output buffer 317 stores packet data, while references (e.g., pointers) to that packet data are kept in different queues for each egress pipeline 315. The egress pipelines request their respective data from the common data buffer using a queuing policy that is control-plane configurable. When a packet data reference reaches the head of its queue and is scheduled for dequeuing, the corresponding packet data is read out of the output buffer 317 and into the corresponding egress pipeline 315. In some embodiments, packet data may be referenced by multiple pipelines (e.g., for a multicast packet). In this case, the packet data is not removed from this output buffer 317 until all references to the packet data have cleared their respective queues.

Figure 4:
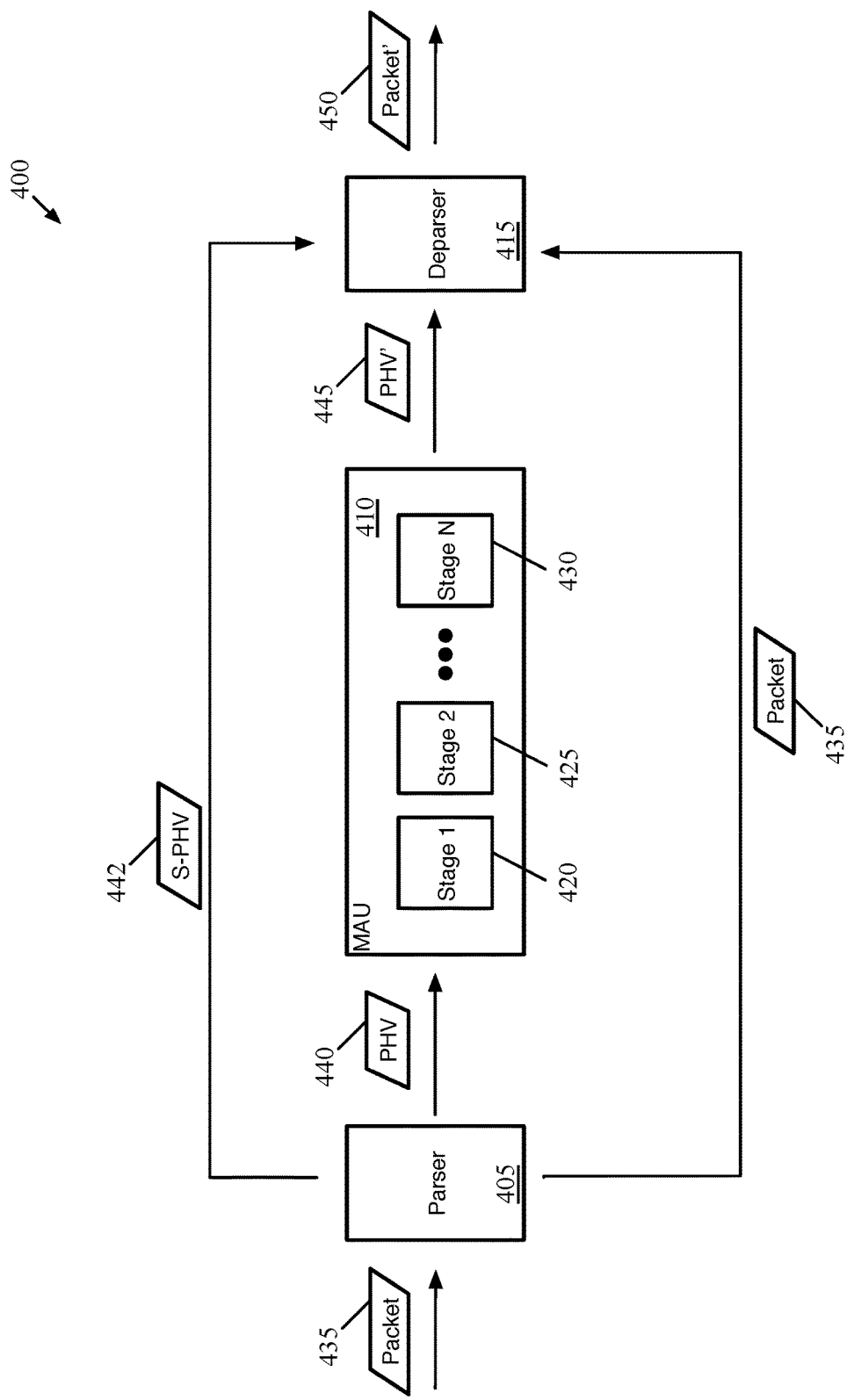
FIG. 4 conceptually illustrates the flow of data through a packet processing pipeline of some embodiments

FIG. 4 conceptually illustrates the flow of data through a packet processing pipeline 400 of some embodiments (e.g., one of the ingress or egress pipelines of FIG. 1) in more detail. As in FIG. 1, the packet processing pipeline 400 includes a parser 405, a match-action unit 410, and a deparser 415. The match-action unit 410 includes several stages 420-430 for processing packets received by the pipeline. It should be understood that the term packet may be used herein to refer to various formatted collections of bits that may be sent across a network, such as Ethernet frames, IP packets, TCP segments, UDP datagrams, etc. While this and the examples below refer to packets, it should be understood that the invention should not be limited to any specific format or type of data message.

The parser 405 receives a packet 435 and extracts header fields into a PHV. In some embodiments, the parser 405 receives a packet as a formatted collection of bits in a particular order, and parses the packet into its constituent header fields according to a parse graph state machine. That is, the parser 405 starts from the beginning of the packet and parses each header field in order, assigning these header fields to fields (e.g., data containers) of a PHV, which is sent to the match-action unit 410. Based on the values of certain fields (e.g., the Ethertype field of an Ethernet header, the Protocol field of an Internet Protocol header, etc.), the parser 405 can determine the structure of the next set of header fields. The parser 405 places specific header field bits into specific locations in the PHV data containers, in some embodiments, so that the MAU 410 and deparser 415 can locate the packet header field values for evaluation (by the MAU) and packet construction (by the deparser). The packet header fields stored in the PHV include header fields up to a specific point of the packet (e.g., as determined by the parse graph state machine).

In some embodiments, the PHV includes a primary PHV 440 and a secondary PHV 442. The parser 405 sends the primary PHV 440 to the MAU, while the secondary PHV 442 bypasses the MAU and is sent directly to the deparser. In some embodiments, the PHV for a particular packet must include all of the packet header fields (bits) up to a particular cutoff point in a packet, because of the manner in which the packet data is transmitted on the physical wires through the hardware forwarding element and the manner in which the deparser reconstructs the packet. By using the secondary PHV 442, packet header fields that are not required for packet processing do not take up space in the primary PHV. Because the primary PHV 440 is sent to the MAU stages, the primary PHV 440 should be of a limited size.

In addition, as shown, the parser sends the entire packet 435 directly to the deparser via a separate path (e.g., via separate wiring) that does not pass through the MAU 410. In other embodiments, the parser sends only the payload (i.e., the portion of the packet not stored in the PHV 440) via this direct route to the deparser 415.

The MAU 410 processes the packet by analyzing and modifying the primary PHV 440 over the course of several match-action stages 420-430. Each of these match-action stages of some embodiments includes (i) a match sub-unit that compares one or more fields of the PHV 440 to flow entries in one or more match tables to identify one or more matching flow entries and (ii) an action sub-unit that performs an action or actions specified by the identified matching flow entries. These actions may include forwarding the packet out a specific port, dropping the packet, mirroring the packet to a buffer on the forwarding element, specifying the next stage in the MAU 410 for processing the packet, etc. In addition, the actions may modify one or more fields of the PHV (e.g., modifying a MAC or IP address, decreasing the time to live, etc.). The MAU 410 outputs a modified PHV (PHV') 445 to the deparser 415.

Thus, the deparser 415 receives the modified primary PHV 445 as well as the secondary PHV 442 and the full data packet 435. The deparser 415 combines this data into a modified packet 450, which is output (e.g., to the traffic manager, or to an output port of the forwarding element). Though not shown here, in some embodiments the deparser receives a set of data along with the modified PHV 445 (or as part of the modified primary PHV 445) that indicates which packet header fields should be included in the output packet 450. In some embodiments, the deparser also receives data indicating which headers need to be updated (e.g., IP length or checksum fields) based on the headers included in the final packet. The deparser uses this set of data along with stored data that specifies locations in the PHV for the bits of each packet header field to generate an ordered list of references to locations in the PHV 442 and 445. Based on this list, the deparser 445 constructs the modified packet 450 using (i) the packet header field values stored in the primary and secondary PHVs 442 and 445 and (ii) the packet 435 (i.e., for the payload portion of the packet, which typically is unchanged).

Figure 5:
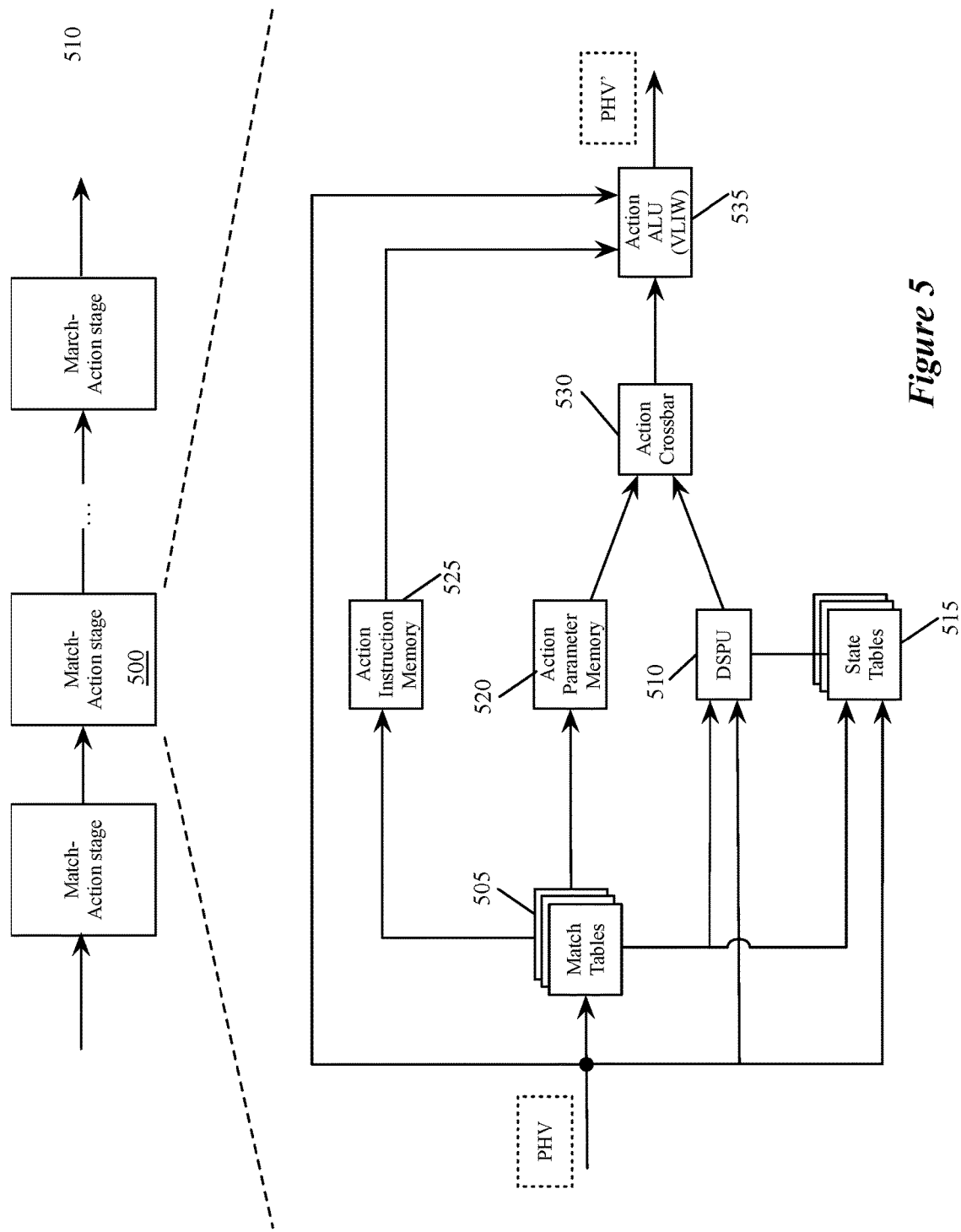
FIG. 5 illustrates an example of a match-action unit of some embodiments.

FIG. 5 illustrates an example of a match-action unit of some embodiments. As mentioned above, an ingress pipeline or egress pipeline of some embodiments has several MAU stages, each of which includes packet-processing circuitry for forwarding received data packets and/or performing stateful operations based on these data packets. These operations are performed by processing values stored in the PHVs (i.e., the primary PHVs) of the packets.

As shown in FIG. 5, the MAU stage 500 in some embodiments has a set of one or more match tables 505, a data plane stateful processing unit 510 (DSPU), a set of one or more stateful tables 515, an action crossbar 530, an action parameter memory 520, an action instruction memory 525, and an action arithmetic logic unit (ALU) 535. The match table set 505 can compare one or more fields in a received PHV to identify one or more matching flow entries (i.e., entries that match the PHV). The match table set can be TCAM tables or exact match tables in some embodiments. In some embodiments, the match table set can be accessed at an address that is a value extracted from one or more fields of the PHV, or it can be a hash of this extracted value.

In some embodiments, the value stored in a match table record that matches a packet's flow identifier, or that is accessed at a hash-generated address, provides addresses for the action parameter memory 520 and action instruction memory 525. Also, such a value from the match table can provide an address and/or parameter for one or more records in the stateful table set 515, and can provide an instruction and/or parameter for the DSPU 510. As shown, the DSPU 510 and the stateful table set 515 also receive a processed PHV. The PHVs can include instructions and/or parameters for the DSPU, while containing addresses and/or parameters for the stateful table set 515.

The DSPU 510 in some embodiments performs one or more stateful operations, while a stateful table 515 stores state data used and generated by the DSPU 510. In some embodiments, the DSPU is a programmable arithmetic logic unit (ALU) that performs operations synchronously with the dataflow of the packet-processing pipeline (i.e., synchronously at the line rate). As such, the DSPU can process a different PHV on every clock cycle, thus ensuring that the DSPU would be able to operate synchronously with the dataflow of the packet-processing pipeline. In some embodiments, a DSPU performs every computation with fixed latency (e.g., fixed number of clock cycles). In some embodiments, the local or remote control plane provides configuration data to program a DSPU.

The DSPU 510 output an action parameter to the action crossbar 530. The action parameter memory 520 also outputs an action parameter to this crossbar 530. The action parameter memory 520 retrieves the action parameter that it outputs from its record that is identified by the address provided by the match table set 505. The action crossbar 530 in some embodiments maps the action parameters received from the DSPU 510 and action parameter memory 520 to an action parameter bus 540 of the action ALU 535. This bus provides the action parameter to this ALU 535. For different data packets, the action crossbar 530 can map the action parameters from DSPU 510 and memory 520 differently to this bus 540. The crossbar can supply the action parameters from either of these sources in their entirety to this bus 540, or it can concurrently select different portions of these parameters for this bus.

The action ALU 535 also receives an instruction to execute from the action instruction memory 525. This memory 525 retrieves the instruction from its record that is identified by the address provided by the match table set 505. The action ALU 540 also receives the PHV for each packet that the MAU processes. Such a PHV can also contain a portion or the entirety of an instruction to process and/or a parameter for processing the instruction.

The action ALU 540 in some embodiments is a very large instruction word (VLIW) processor. The action ALU 540 executes instructions (from the instruction memory 535 or the PHV) based on parameters received on the action parameter bus 540 or contained in the PHV. The action ALU stores the output of its operation in the PHV in order to effectuate a packet forwarding operation and/or stateful operation of its MAU stage 500. The output of the action ALU forms a modified PHV (PHV') for the next MAU stage.

In other embodiments, the match tables 505 and the action tables 515, 520 and 525 of the MAU stage 500 can be accessed through other methods as well. For instance, in some embodiments, each action table 515, 520 or 525 can be addressed through a direct addressing scheme, an indirect addressing scheme, and an independent addressing scheme. The addressing scheme that is used depends on the configuration of the MAU stage, which in some embodiments, is fixed for all data packets being processed, while in other embodiments can be different for different packets being processed.

In the direct addressing scheme, the action table uses the same address that is used to address the matching flow entry in the match table set 505. As in the case of a match table 505, this address can be a hash generated address value or a value from the PHV. Specifically, the direct address for an action table can be a hash address that a hash generator (not shown) of the MAU generates by hashing a value from one or more fields of the PHV. Alternatively, this direct address can be a value extracted from one or more fields of the PHV.

On the other hand, the indirect addressing scheme accesses an action table by using an address value that is extracted from one or more records that are identified in the match table set 505 for a PHV. As mentioned above, the match table records are identified through direct addressing or record matching operations in some embodiments.

The independent address scheme is similar to the direct addressing scheme except that it does not use the same address that is used to access the match table set 505. Like the direct addressing scheme, the table address in the independent addressing scheme can either be the value extracted from one or more fields of the PHV, or it can be a hash of this extracted value. In some embodiments, not all the action tables 515, 520 and 525 can be accessed through these three addressing schemes, e.g., the action instruction memory 525 in some embodiments is accessed through only the direct and indirect addressing schemes.

Figure 6:
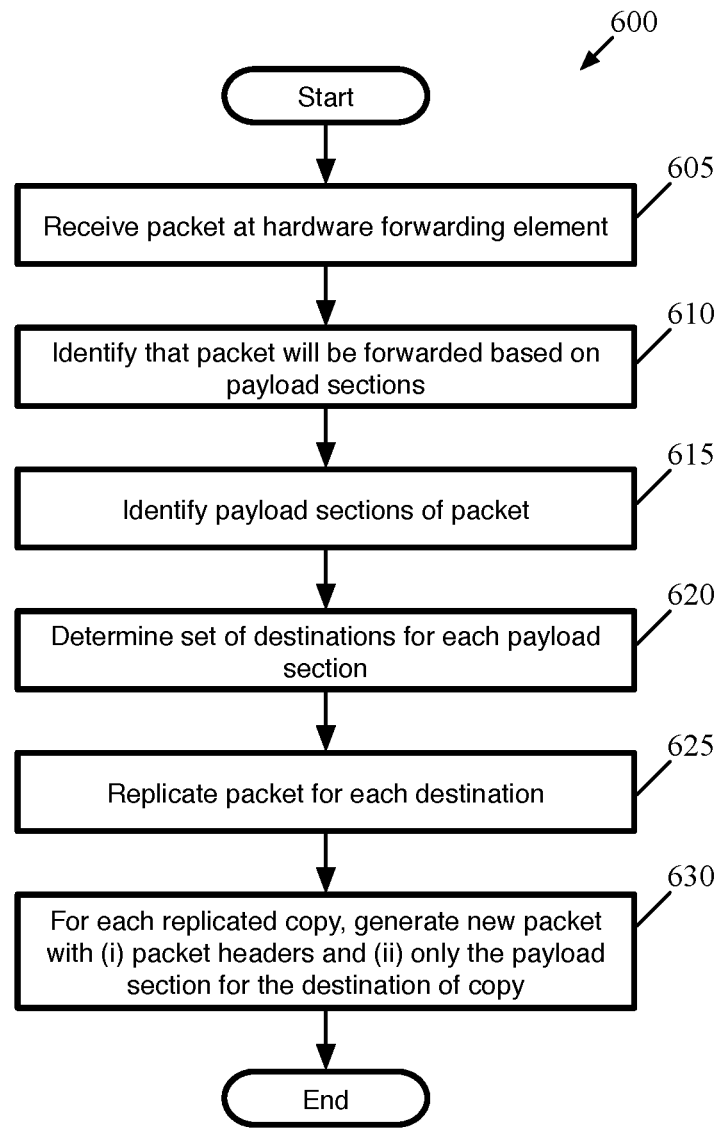
FIG. 6 conceptually illustrates a process of some embodiments for replicating different payload portions of a packet for different destinations.

With the various circuitry of the forwarding element of some embodiments described, the operations of such a forwarding element to send different payload sections of a packet to different destinations will be described. FIG. 6 conceptually illustrates a process 600 of some embodiments for replicating different payload portions of a packet for different destinations. The process 600 is performed by a network forwarding integrated circuit (e.g., such as that described above), though different embodiments perform the various operations differently. For instance, some embodiments use a single ingress pipeline and single egress pipeline, while other embodiments use a pipeline-chaining technique that sends a packet through multiple ingress pipelines and multiple egress pipelines. FIGS. 7-10 illustrate examples of such a technique using a single ingress pipeline and single egress pipeline. The process 600 is described in part by reference to these figures.

As shown, the process 600 begins by receiving (at 605) a packet at the hardware forwarding element. As described above, the hardware forwarding element receives this packet via a port, which is associated with a specific ingress pipeline. As such, the packet is initially processed by the ingress pipeline that connects to the port at which the packet is received.

Next, the process 600 identifies (at 610) that the packet will be forwarded based on the contents of one or more payload sections. It should be understood that the process 600 assumes that the packet is a market data packet or other type of packet that the forwarding element replicates and forwards based on the payload sections (rather than, e.g., L2 and/or L3 headers). In some embodiments, the ingress pipeline parser identifies that the packet is a particular type of packet (e.g., a market data packet) based on the packet headers (e.g., the L2-L4 headers) or a specific field thereof.

The process 600 then identifies (at 615) payload sections of the packet. The packet might have a single payload section or could have multiple payload sections, depending on how the sender is packaging the data. The ingress parser also identifies the payload sections in some embodiments, and provides this data to the MAU within the primary PHV. Based on the initial identification that the packet is a particular type of packet that is forwarded based on its payload sections, the parser is configured to identify the multiple payload sections of the packet and store each of these in separate data containers of the primary PHV. For example, for market data packets, the parser identifies each stock ticker symbol and stores this with its subsequent related stock data in a PHV container (or containers, depending on the size of the stock data).

Figure 7:
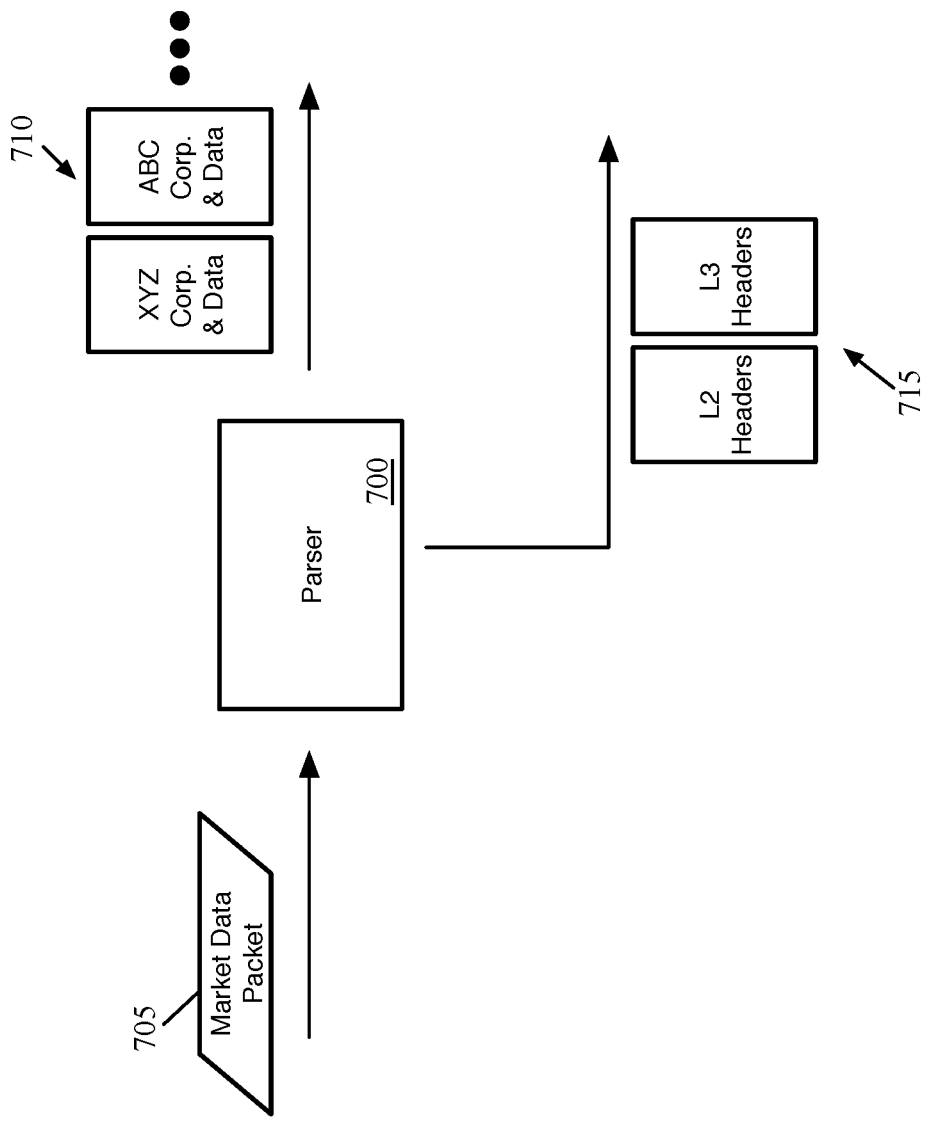
FIG. 7 conceptually illustrates the operation of a parser of some embodiments to generate primary and secondary PHVs for a market data packet.

FIG. 7 conceptually illustrates the operation of a parser 700 of some embodiments to generate primary and secondary PHVs for a market data packet 705. The parser 700 receives the market data packet 705, and parses at least a portion of the packet into a primary PHV 710 and a secondary PHV 715. The secondary PHV 715, which stores the values of various packet header fields that are not required by the ingress MAU, includes data containers (or multiple data containers) for the L2 and L3 headers. In some embodiments, all of the L2 and L3 headers are placed in various containers of the secondary PHV, while in other embodiments some of the L2 and L3 header fields are stored in the primary PHV, if these will be used by the ingress pipeline.

The primary PHV containers 710 store the different payload sections. In the figure, each section is conceptually shown as a single container. However, if a payload section is larger than the largest available PHV container, then a section may be spread across multiple such containers. Some embodiments format the data in these containers in a predefined manner, with the section identifier (e.g., a stock ticker symbol) stored in a specific subset of the bits of the container and the remainder of the container occupied by the accompanying data.

Returning to FIG. 6, the process 600 determines (at 320) a set of destinations for each payload section. Different embodiments of the hardware forwarding element perform this operation differently (e.g., with different components performing different aspects of the destination determination. In some embodiments, the match-action unit, at one (or more) of its match-action stages, matches the payload sections in the primary PHV against a table of possible payload section types. For example, the table of some embodiments includes entries for each possible stock symbol that corresponds to one or more destinations on a local network (e.g., servers for making high-frequency trading decisions for that particular stock). Some embodiments generate a bitmap indicating which of the possible symbols are found in the packet. As mentioned, each payload section will be sent to one or more destinations, and the match-action unit translates the bitmap into a multicast group identifier that is stored with the PHV and eventually sent to the traffic management unit.

Figure 8:
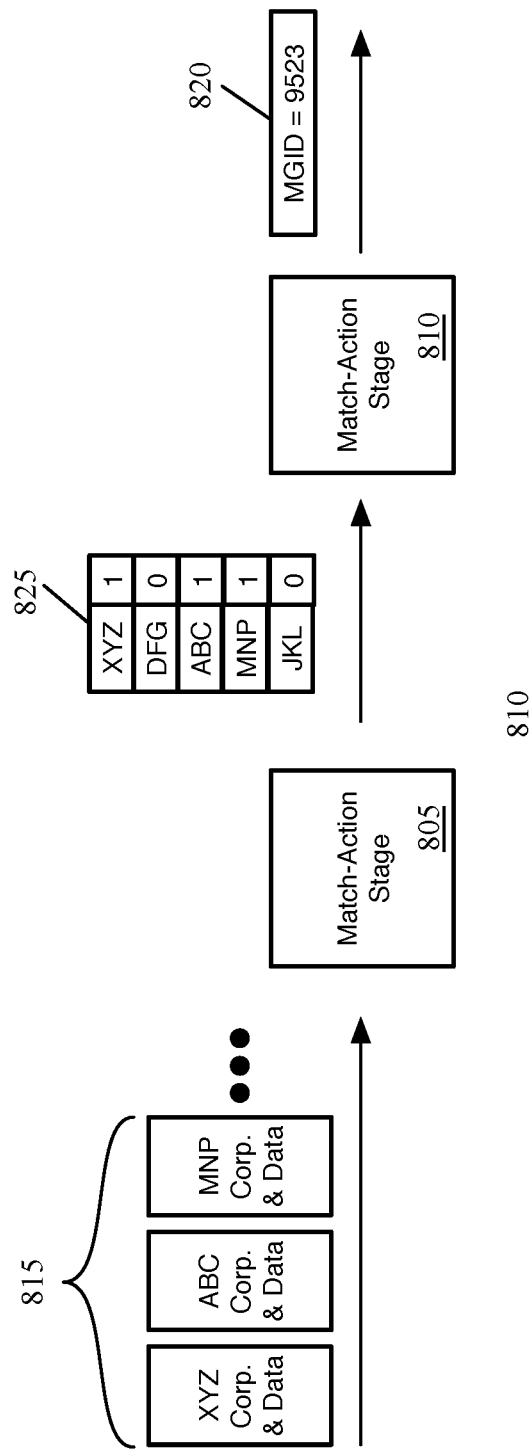
FIG. 8 conceptually illustrates a set of match-action stages generating a multicast group identifier for a set of packet payload sections.

FIG. 8 conceptually illustrates a set of match-action stages 805 and 810 generating a multicast group identifier 820 for a set of packet payload sections. The first match-action stage 805 (which may be the first stage in the MAU or a later stage after several other MAU stages have processed the packet) receives the PHV 815, which includes containers storing the packet payload sections identified by the parser. In this example, the packet payload includes sections containing data regarding the stocks of XYZ Corp., ABC Corp., and TUV Corp. The match-action stage 805 of some embodiments includes a match table (not shown) with entries for each possible type of payload section that needs to be processed by the forwarding element. In general, while the list of all possible stocks is massive, a company performing high-frequency trading will only be interested in certain stocks, and thus the list of possible payload sections that the forwarding element is interested in is much smaller.

In this case, the match-action stage 805 checks for five different possible payload sections, three of which are present in the current PHV 815. The bitmap 825 illustrates that XYZ Corp., ABC Corp., and MNP Corp. payload sections are present in the current PHV 815, while DFG Corp. and JKL Corp. sections are not. If the PHV 815 included other types of sections (i.e., sections for stocks for which the match table of MAU stage 805 does not have an entry), some embodiments ignore these sections. The bitmap 825 is stored in a PHV container in some embodiments, and sent to the match-action stage 810 (or an intermediate match-action stage) along with the rest of the PHV 815.

The second match-action stage 810 need not be directly after the stage 805, if the pipeline is configured to perform other intermediate processing. This stage generates a multicast group identifier 820 from the bitmap 825. In some embodiments, the match-action stage 810 includes a match table with entries for each possible bitmap, with the corresponding action entry writing a multicast group identifier to a specific PHV container location. In other embodiments, each symbol maps to a set of bits representing the destinations for the packet sections. These sets of bits then combine to form a multicast group identifier. Because it may not be possible to define a multicast group identifier for every possible port combination, some embodiments dynamically define multicast groups only for the port combinations that may be used in these queries. In other embodiments, to cut down on the number of possible multicast group identifiers needed, the ports are grouped such that all ports in a group receive packets if any of those ports needs the packet. In this case, the packets for ports that do not actually need to receive the packet are dropped in the egress pipeline.

Returning again to FIG. 6, the process 600 replicates (at 625) the packet for each set of destinations. In some embodiments, the forwarding element replicates the entire packet (i.e., each replicated copy will include all of the payload sections). As described above, the traffic management unit of some embodiments, as mentioned, handles packet replication as well as directing packets to the correct egress port. The traffic management unit stores a table of multicast group identifiers and the destinations and output ports for each multicast group. Thus, upon receiving a packet along with a multicast group identifier, the traffic management unit replicates the packet a number of times specified by the table for the multicast group identifier, and enqueues each of these replicated copies of the packet into the correct queue for the egress port to which the copy of the packet will be sent.

Figure 9:
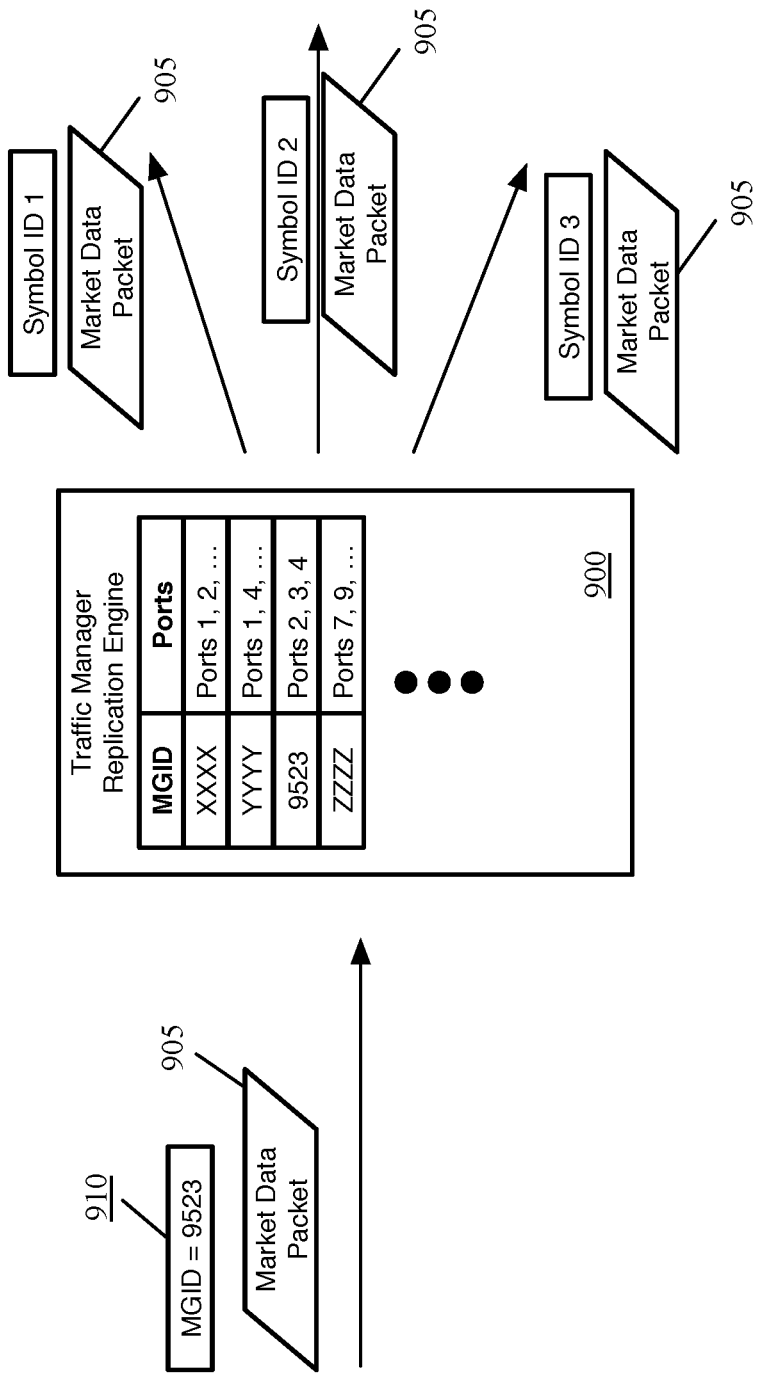
FIG. 9 conceptually illustrates a traffic manager replication engine of some embodiments replicating a market data packet.

FIG. 9 conceptually illustrates a traffic manager replication engine 900 of some embodiments replicating a market data packet 905. As shown, the market data packet 905 is received along with a multicast group identifier 910 specified by the ingress pipeline. The replication engine 900 includes a table that identifies the egress port for all possible multicast group identifiers, in some embodiments. Other embodiments may specify the egress locations in terms of queues. For a network with many servers performing high-frequency trading on many different stocks, the number of multicast group identifiers may be fairly large (in the hundreds, thousands, or even millions), as the forwarding element could receive market data packets having data on any different combination of the various monitored stocks.

In this example, the multicast group identifier 910 (9523) maps to three ports. The replication engine 900 replicates the packet 905 once for each of these ports, and the traffic manager enqueues these packets in three different queues, to be released to the appropriate egress pipeline. The packet copies may all be sent to the same pipeline, or could be enqueued for different pipelines (each pipeline may have many associated queues). As shown, each copy of the market data packet 905 is also sent with a symbol identifier in some embodiments, that specifies the type of payload section to be sent out by the egress pipeline. While in this case, each of the three stocks is sent to a single destination, in many networks a single payload section will be replicated to more than one destination. In addition, in some cases a destination will receive more than one payload section from a packet. In this case, some embodiments provide multiple symbol identifiers with the market data packet 905.

Lastly, the process 600 generates (at 630), for each replicated copy of the packet, a new packet with (i) packet headers and (ii) only the payload section for the destination of that packet copy. These new packets are then output from their respective ports. That is, the new packets output from the forwarding element will have the identified payload section (or multiple payload sections) for the packet's destination, but not any of the other payload sections. In some embodiments, the egress pipeline removes the other payload sections that are not processed by the destination, which minimizes the extraneous processing required by the destination to isolate its desired information.

Figure 10:
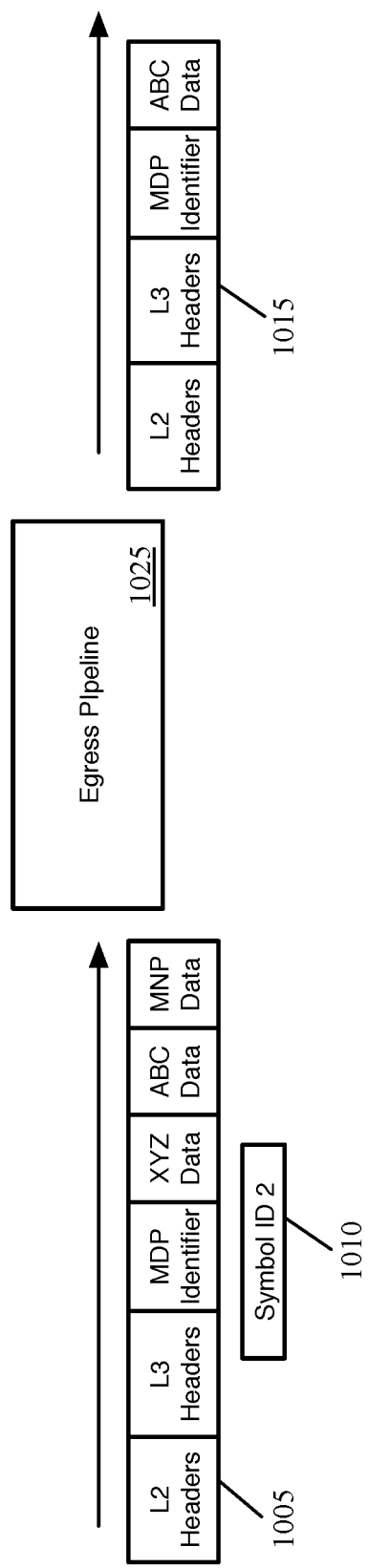
FIG. 10 illustrates an egress pipeline of some embodiments that receives a market data packet and a payload section identifier, and outputs a new packet with only the payload section specified by the received identifier.

FIG. 10 illustrates an egress pipeline 1000 of some embodiments that receives a market data packet 1005 and a payload section identifier 1010, and outputs a new packet 1015 with only the payload section specified by the received identifier 1010. As shown, the replicated market data packet 1005 output by the traffic manager includes L2 and L3 headers, a market data packet identifier, as well as three payload sections (for XYZ Corp., ABC Corp., and MNP Corp.). The egress pipeline 1000 receives this packet along with a payload section identifier 1010, which in this case specifies a particular stock symbol (for ABC Corp.). The MAU of the egress pipeline 1000 (e.g., the MAU of this pipeline) uses the payload section identifier to identify which payload section (e.g., by reference to the PHV container(s) storing that section) to output with the new packet 1015, and the deparser constructs this new packet 1015 with only the one payload section (or multiple payload sections, if the destination is specified to receive more than one of the payload sections of the packet). The L2 and L3 headers may be the original packet headers or a subset of the original packet headers, and will typically have different destination addresses tailored to the destination for the particular copy of the packet.

The process described above by reference to FIGS. 7-10 is one possible set of operations by which a hardware forwarding element of some embodiments can accomplish the replication of different payload sections of a packet to different destinations. Some other embodiments, rather than using these techniques, use a process referred to herein as pipeline chaining. As described, each physical packet processing pipeline in some embodiments is configured to operate as both an ingress pipeline and an egress pipeline. Packets generally are processed by a first pipeline as an ingress pipeline and a second pipeline as an egress pipeline. The second pipeline may be the same pipeline as the first pipeline or a different pipeline from the first pipeline.

For certain packets, however, the hardware forwarding element of some embodiments processes the packets through multiple ingress pipelines and multiple egress pipelines. As an example, a particular packet might be processed by a first pipeline as an ingress pipeline, enqueued by the traffic management unit for and subsequently processed by a second pipeline as an egress pipeline, then looped back to the second pipeline as an ingress pipeline and enqueued by the traffic management unit for and subsequently processed by a third pipeline (which may be the same as or different from the first pipeline) as an egress pipeline.

Figure 11:
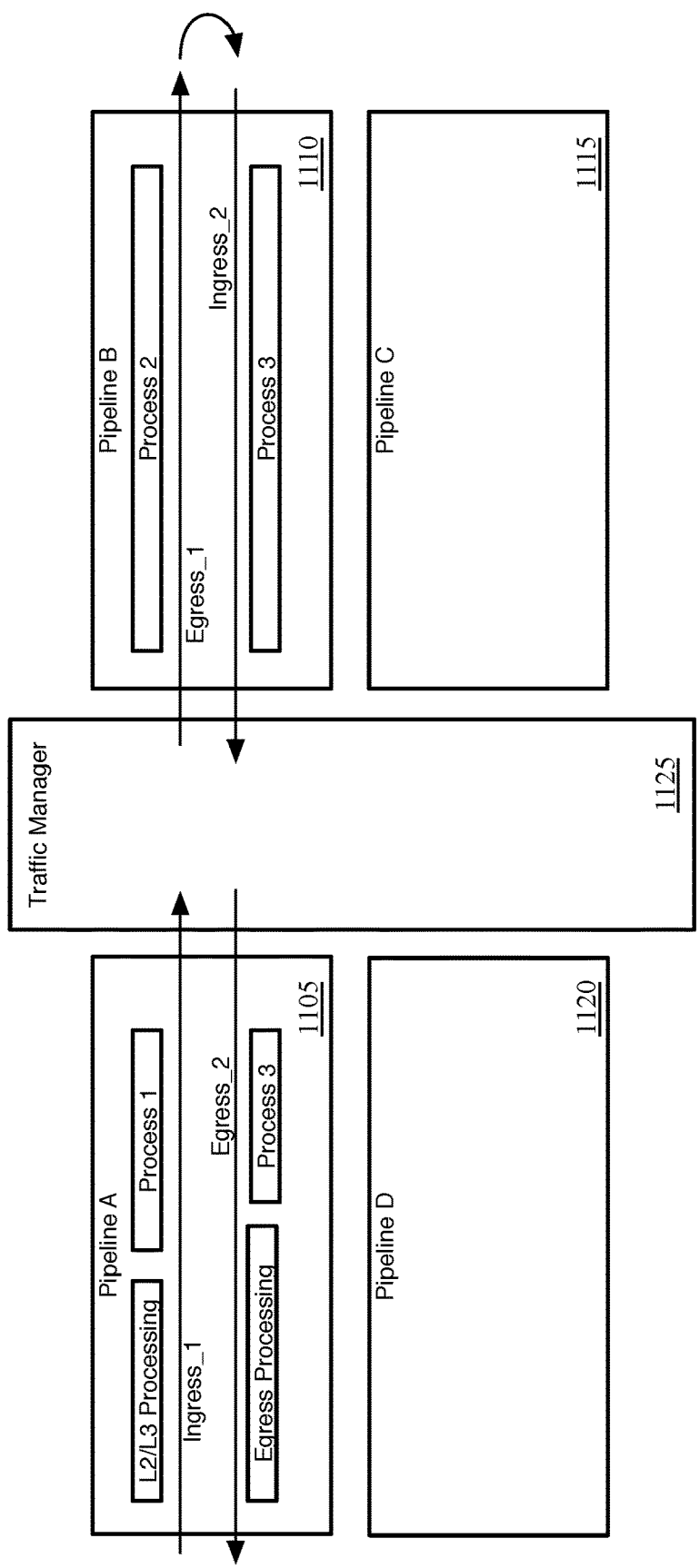
FIG. 11 conceptually illustrates pipeline chaining in a hardware forwarding element with four packet processing pipelines as well as a traffic manager.

FIG. 11 conceptually illustrates a hardware forwarding element 1100 with four packet processing pipelines 1105-1120 as well as a traffic manager 1125. As noted, these pipelines may act on packets as either ingress or egress pipelines. In some embodiments, each pipeline MAU stage can process one ingress packet and one egress packet per clock cycle. This figure illustrates an example packet that is received at a port associated with the pipeline 1105 and thus initially processsed by this pipeline as an ingress pipeline. Based on the decisions of the ingress pipeline 1105, the traffic manager 1125 releases the packet to the pipeline 1110 for egress. However, rather than being output to a port of the forwarding element from egress pipeline 1110, the packet is looped back to pipeline 1110 as a second ingress pipeline. After again passing through the traffic manager 1125, the packet is released to the initial pipeline 1105 as a second egress pipeline. Finally, after this egress processing, the packet is transmitted from the forwarding element port.

Similarly, additional loopbacks and ingress/egress pipeline pairs may be used in some embodiments (e.g., four ingress and four egress pipelines, etc.). Pipeline chaining, as shown in FIG. 11, allows the standard overhead of packet processing to be primarily contained to the initial ingress and final egress pipelines, with the internal pipelines able to perform more complex processing or use larger tables than are available for a single ingress/egress pipeline pair. For example, in some embodiments, large tables (e.g., longest-prefix-matching for IP routes or access control lists) are spread across multiple pipelines. In other embodiments, multiple complex processes can be performed in the different pipelines (e.g., longest-prefix-matching in a first pipeline, access control lists in a second pipeline, tunneling/encapsulation in a third pipeline, etc.). The only requirement imposed by some embodiments is that the output port/queue be determined determined prior to the final egress pipeline.

In the case of FIG. 11, the first pipeline 1105 performs standard L2 and L3 processsing as an initial ingress pipeline, as well as a second process (Process 1). Because the second pipeline 1110 is not the final egress pipeline, it can be devoted entirely to a complex process (Process 2) as the initial egress pipeline. For the second pipeline 1110 acting as the second ingress pipeline, it performs a portion of a third process (Process 3). This process continues in the final egress pipeline (the first pipeline 1105), with additional resources devoted to egress processing (i.e., preparing the packet to be transmitted from the forwarding element.

In this example, only two pipelines 1105 and 1110 are used. In some embodiments, when a packet is looped back from an egress pipeline to an ingress pipeline, the forwarding element structure requires that these be the same pipeline. This is because the egress packets do not pass through the traffic manager, which enables the crossover from one pipeline to another. However, any time that the packet passes from an ingress to an egress pipeline, the packet is sent through the traffic manager, and therefore can be sent to any egress pipeline.

Figure 12:
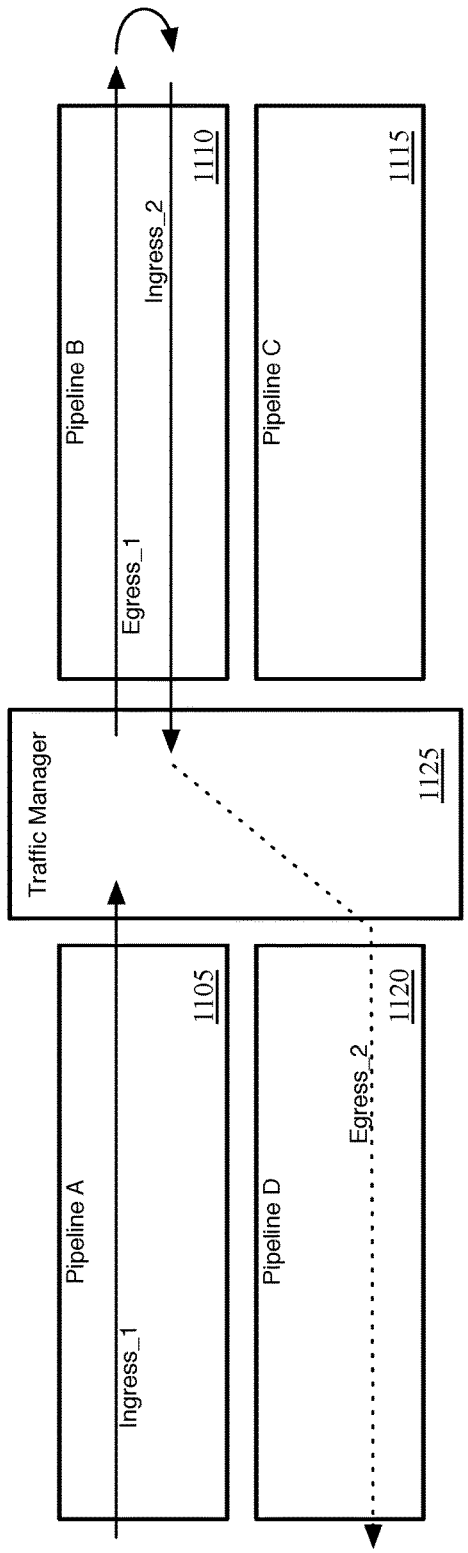
FIGS. 12 and 13 illustrate examples of different possible packet paths through the forwarding element of FIG. 11.
Figure 13:
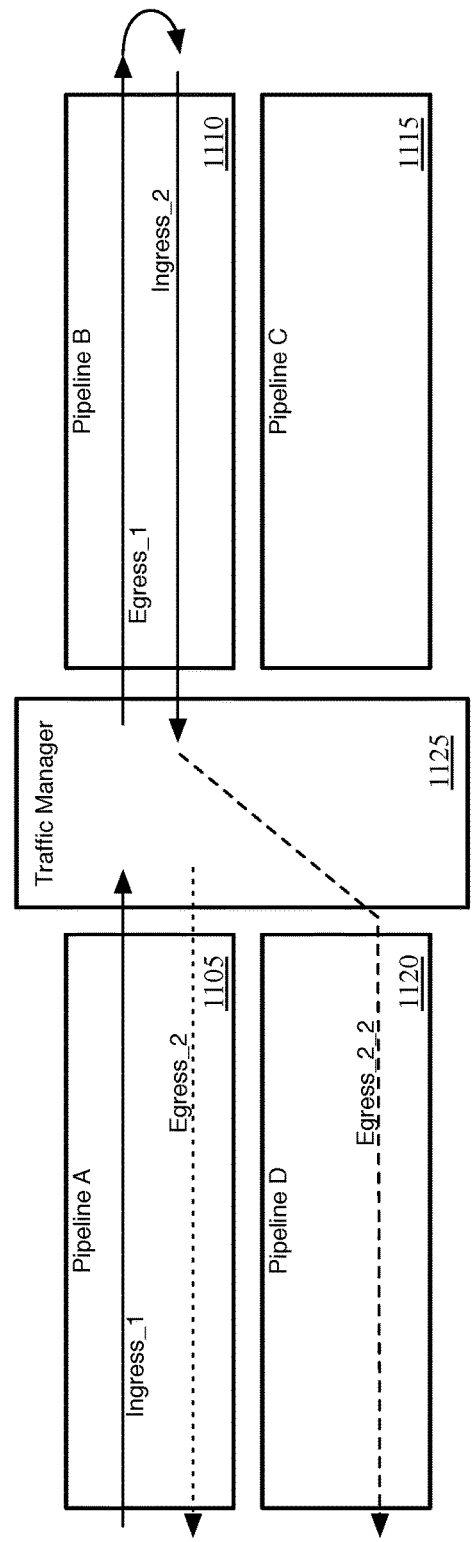

FIGS. 12 and 13 illustrate examples of different possible packet paths through the forwarding element 1100. In the example of FIG. 12, a packet received at a port associated with the first pipeline 1105 passes through that pipeline as an initial ingress pipeline, and is released to the second pipeline 1110 as the initial egress pipeline. The packet loops back to the second pipeline 1110 for its second ingress pipeline, but in this case the traffic manager 1125 sends the packet to the fourth pipeline 1120 for the second egress pipeline (as opposed to back out the same pipeline as the initial egress pipeline.

In the example of FIG. 13, the packet again passes through the first pipeline 1105 as the initial ingress pipeline, then the second pipeline 1110 as the initial egress pipeline and second ingress pipeline. In this case, however, the packet is replicated by the traffic manager 1125, with each of the two packets being sent to a different second egress pipeline. One copy of the packet is processed through the first pipeline 1105, while the second copy of the packet is processed through the fourth pipeline 1120.

Figure 14:
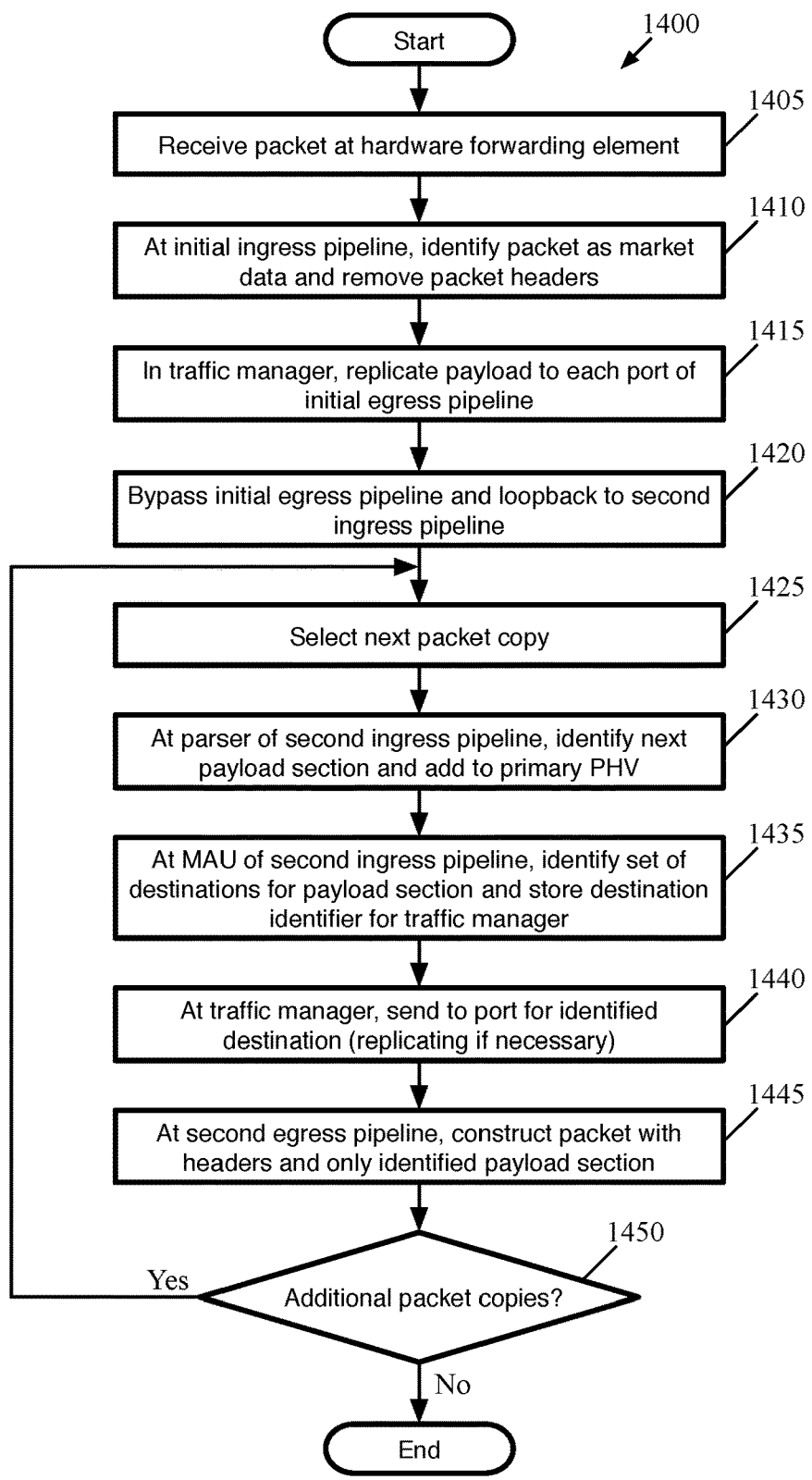
FIG. 14 conceptually illustrates a process of some embodiments for replicating the different sections of a packet payload to different destinations using pipeline chaining.

Some embodiments use pipeline chaining to replicate different sections of a packet payload to different destinations (i.e., achieve the results of FIGS. 7-10 in a different manner). FIG. 14 conceptually illustrates a process 1400 of some embodiments for replicating the different sections of a packet payload to different destinations using pipeline chaining. This process is performed by a hardware forwarding element having multiple processing pipelines with pipeline chaining enabled, with different operations performed by different circuitry of the forwarding element.

As shown, the process 1400 begins by receiving (at 1405) a packet at the hardware forwarding element. As described above, the hardware forwarding element receives this packet via a port, which is associated with a specific ingress pipeline. As such, the packet is initially processed by the pipeline that connects to the port at which the packet is received, as an ingress pipeline. While the process 1400 is described by reference to market data packets, it should be understood that some embodiments may perform a similar replication and distribution process for other types of packets with defined payload sections.

At this initial ingress pipeline, the process identifies (at 1410) the packet as a market data packet and removes the packet headers. In some embodiments, rather than having the ingress pipeline parser identify a packet as a market data packet (or other packet with multiple payload sections to be replicated), this task is performed by the MAU of the initial ingress pipeline. Specifically, in addition to performing standard overhead packet processing (e.g., layer 2 and layer 3 processing), the initial ingress pipeline MAU identifies the packet as a market data packet, and passes this information with the packet to the traffic manager. In addition, this initial ingress pipeline removes the packet headers (e.g., the layer 2 and layer 3 headers) before sending the packet to the traffic manager. In some embodiments, the deparser receives instructions to not include these headers in the packet it constructs and delivers to the traffic manager.

Figure 15:
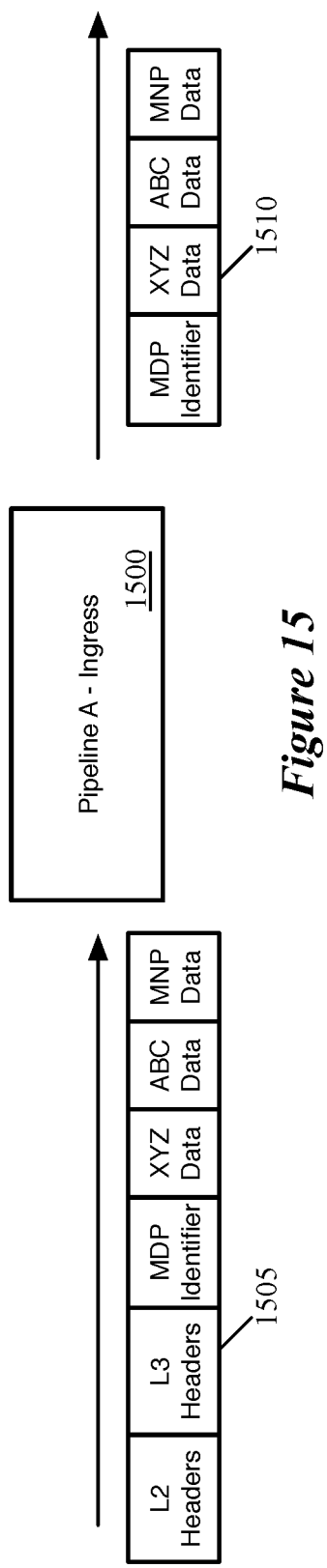
FIG. 15 conceptually illustrates the operation of an initial ingress pipeline for a market data packet to remove the L2 and L3 packet headers.

FIG. 15 conceptually illustrates the operation of an initial ingress pipeline 1500 for a market data packet 1505 to remove the L2 and L3 packet headers. As shown, the pipeline 1500 receives the market data packet 1505 (e.g., from a port of the hardware forwarding element that is associated with the pipeline 1500). The market data packet 1505 includes L2 and L3 headers, a market data packet identifier (which may be part of these headers in some embodiments), and three payload sections. As a result of the ingress pipeline 1500 determining that the packet 1505 is a market data packet, the deparser of this pipeline outputs to the traffic manager a modified packet 1510 that includes only the market data packet identifier and the payload sections. Other embodiments provide only the payload sections to the traffic manager, with an identifier separate from the packet that indicates that the packet is a market data packet.

Figure 16:
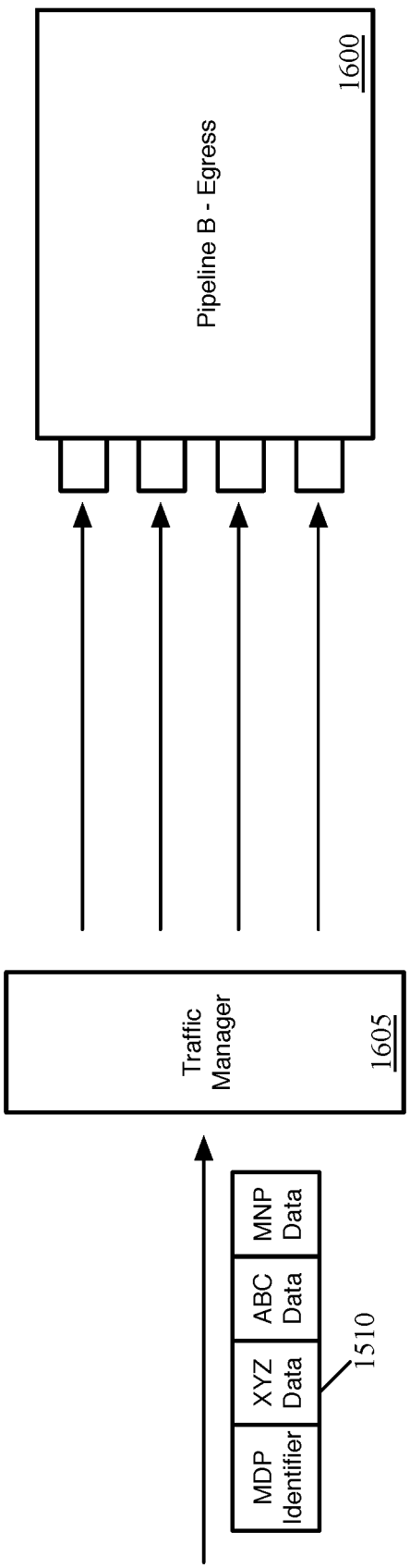
FIG. 16 illustrates an example of replicating a payload to each port of an egress pipeline in which the egress pipeline has four ports.

The process 1400 next replicates, in the traffic manager, the payload to each port of an initial egress pipeline (or each of several ports of the pipeline). This egress pipeline may be the same pipeline that acted as the original ingress pipeline, or a different pipeline. In some embodiments, a specific packet processing pipeline is dedicated to operate as the initial egress and second ingress pipeline for packets with multiple payload sections. Different embodiments of the hardware forwarding element may have different numbers of ports per pipeline. For instance, FIG. 16 illustrates an example in which the pipeline 1600 that operates as the initial egress pipeline has four ports. As such, in this example, the traffic manager 1605 replicates the market data packet payload 1510 to each of these four ports. At this point, the specific payload sections present in the packet (and thus the destinations for the packet data) are not known, so all (or some prespecified number) of the ports are used.

The process 1400 then, for each replicated packet payload, bypasses the initial egress pipeline and loops back (to, e.g., the same pipeline) as an ingress pipeline. That is, in some embodiments, the initial egress pipeline operates in bypass mode, such that once dequeued from the traffic management unit the packets are sent out of the initial egress pipeline without any processing, and subsequently looped back into the same pipeline as a second ingress pipeline. In some embodiments, this operation simply reclassifies the packets as ingress packets, while in other embodiments, the packet bits are moved to the end of the pipeline and looped back in on an ingress wire.

The process 1400 selects (at 1425) a next packet copy. The remainder of the process 1400 illustrates each of the packet payload copies being processed serially. It should be understood that while some embodiments may process one payload copy at a time, other embodiments may perform the operations in parallel (e.g., with multiple parsers), multiple MAUs, etc. within a pipeline. In yet other embodiments, the packet copies may proceed through the pipeline one after the other, with different packet copies at different MAU stages for each clock cycle (i.e., with a first operation of the process 1400 being performed on a first packet copy while a second operation is performed on a second packet copy).

At the parser of the second ingress pipeline, the process identifies (at 1430) the next payload section and adds this section to the primary PHV. In some embodiments, the parser identifies the first payload section for the first replicated copy, the second payload section for the second replicated copy, etc. In some embodiments, the parser is not looking for a specific symbol, but rather counting off sections so that for each packet, a different section is identified. If there are more replicated copies of the packet than payload sections, some embodiments drop the additional copies. Based on the format and maximum size of the multi-section packets, some embodiments ensure that there are at least as many copies as the maximum number of sections.

In some embodiments, the same physical parser circuit is used for each packet, and an identifier is incremented with each copy of the packet that specifies which payload section the parser should identify. Other embodiments, however, have a separate parser circuit for each port with which the packet is associated, and these different parsers are configured to identify a different payload section (e.g., a first parser configured to identify the first payload section, a second parser configured to identify the second payload section, etc.).

Figure 17:
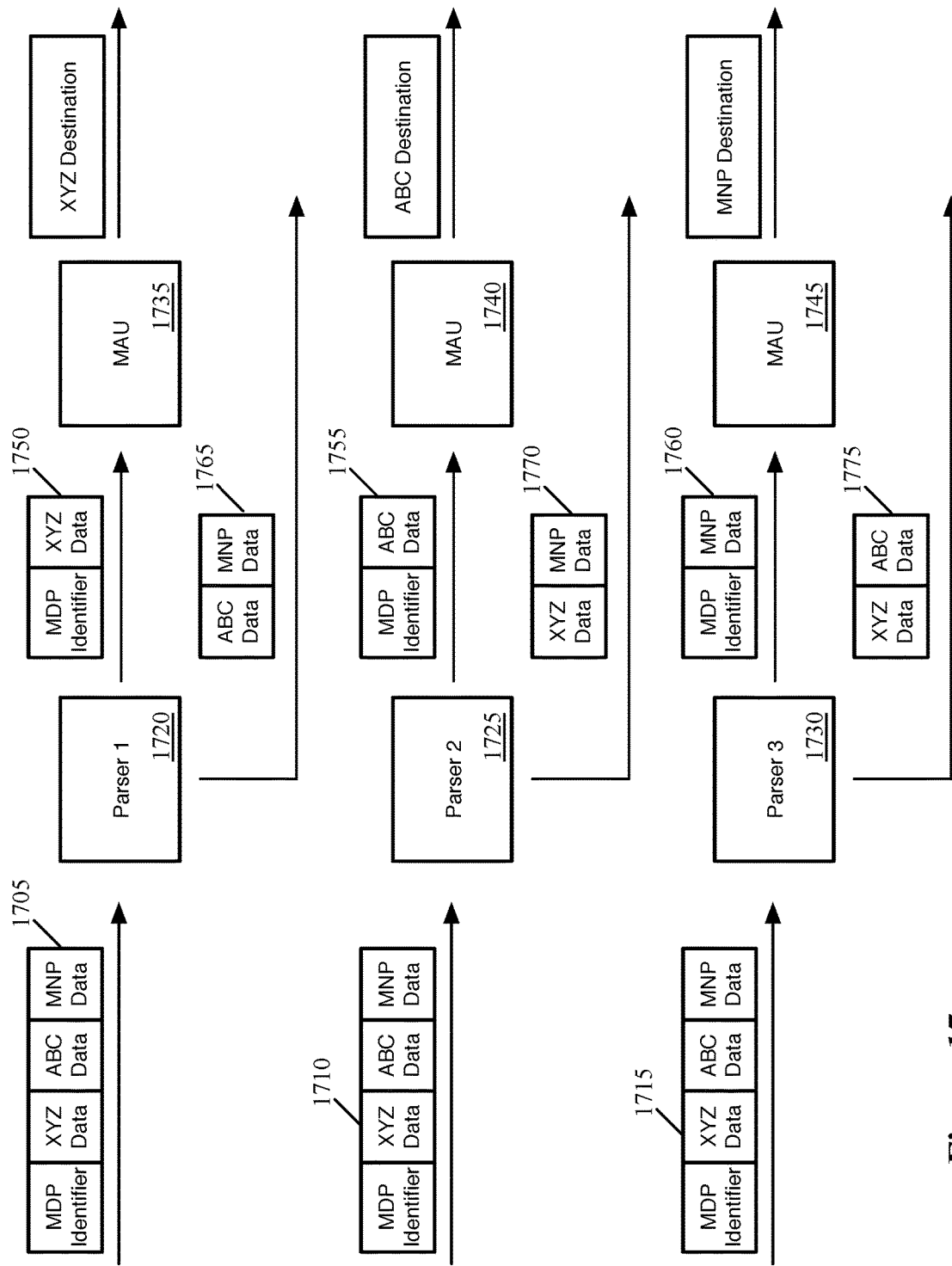
FIG. 17 conceptually illustrates three copies of a packet payload being processed through a second ingress pipeline of some embodiments.

FIG. 17 conceptually illustrates three copies 1705-1715 of a packet payload (i.e., the packet payload 1510) being processed through the second ingress pipeline of some embodiments. In this case, each of the packet payload copies is processed by a different parser 1720-1730, respectively.

As mentioned, these might be different physical parsers associated with each port, or the same parser acting on each of the packet payload copies sequentially. In addition to these three copies, some embodiments generate additional copies that would be dropped (as there are only three payload sections).

The first parser 1720 parses the first packet payload copy 1705 and sends the market data identifier (or other data specifying that this is a market data packet) along with the first payload section (for XYZ Corp.) to the first MAU 1735 within the primary PHV 1750, while the other two payload sections are sent to the secondary PHV 1765. The second parser 1725 parses the second packet payload copy 1710 and sends the market data identifier along with the second payload section (for ABC Corp.) to the MAU 1740 within the primary PHV 1755, while the other two payload sections are sent to the secondary PHV 1770 for this packet. Lastly, the third parser 1730 parses the third packet payload copy 1715 and sends the market data identifier along with the third payload section (for MNP Corp.) to the MAU 1745 within the primary PHV 1760, while the other two payload sections are sent to the secondary PHV 1775 for this packet.

Returning to FIG. 14, at the MAU of the second ingress pipeline, the process 1400 next identifies (at 1435) the set of destinations for the payload section and stores a destination identifier for the traffic manager. That is, each of the different PHVs is sent to the MAU (or to a separate MAU, as shown in the example of FIG. 17) of the second ingress pipeline. The MAU matches over the payload section identifier (e.g., the stock ticker symbol) and identifies a set of destinations for the payload section. That is, in some embodiments the match table includes entries for each possible payload section type, and the specified action entry for each of these match table entries is a set of destinations to which to send the packet. In some embodiments, the deparser for each packet copy generates a packet with only the payload section isolated for that packet, and passes this packet data along with the destination set identifier to the traffic manager. FIG. 17 illustrates that the MAU 1735 provides a set of destinations for XYZ Corp. packets (along with the primary PHV 1750), the MAU 1740 provides a set of destinations for ABC Corp. packets (along with the primary PHV 1755), and the MAU 1745 provides a set of destinations for MNP Corp. packets (along with the primary PHV 1760).

Next, at the traffic manager, the process 1400 sends (at 1440) the packet to the port for the identified destination, replicating the copy if necessary. Specifically, the traffic manager enqueues each of the packets in the appropriate queue that maps to the port for their destination. In addition, if multiple copies of a particular payload section are required for multiple different destinations, the traffic manager replicates those packets for each destination. For instance, if a particular payload section has six destinations in the network, the traffic manager replication engine replicates the packet containing that payload section five times, and sends the six copies to the differnet queues specific to those destinations.

Lastly, at the second egress pipeline, the process 1400 constructs (at 1445) a packet with headers and only the identified payload section. For each copy of each payload section, the second egress pipeline for that copy adds on the original headers (or a compressed version thereof) to the payload section remaining for that packet copy, and transmits the packet out of the specified forwarding element port. In reinstating the packet header (that was removed by the initial ingress pipeline), some embodiments treat the header as static (i.e., the same as the header of the initially-received packet, and the same for all packets of the particular packet type), with the possible exception of the source and/or destination addresses. Thus, the packet header field values do not need to be stored for use by the eventual last egress pipeline, because this egress pipeline can use the static values for all such packets. For the destination addresses, some embodiments use those of the local destination for each packet. This second egress pipeline may be the same physical packet processing pipeine as the initial ingress pipeline, as the initial egress and second ingress pipeline, or a completely different pipeline. In addition, if the payload section is replicated by the traffic manager, then different copies may be processed by different second egress pipelines.

Finally, at 1450, the process 1400 determines (at 1450) whether there are additional packet copies. If so, the process returns to 1425 to select the next packet copy; otherwise, the process ends. As mentioned, the process 1400 is a conceptual process, and in some embodiments no such specific decision is actually made; instead, the hardware forwarding element processes each packet copy that the traffic manager generates according to the operations 1430-1445 (or similar operations).

FIG. 18 conceptually illustrates an electronic system 1800 with which some embodiments of the invention are implemented. The electronic system 1800 can be used to execute any of the control, virtualization, or operating system applications described above. The electronic system 1800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1800 includes a bus 1805, processing unit(s) 1810, a system memory 1825, a read-only memory 1830, a permanent storage device 1835, input devices 1840, and output devices 1845.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1830, the system memory 1825, and the permanent storage device 1835. From these various memory units, the processing unit(s) 1810 retrieves instructions to execute and data to process in order to execute the processes of the invention. The processing unit(s) may be a single processor or a multi-core processor in different embodiments.

The read-only-memory (ROM) 1830 stores static data and instructions that are needed by the processing unit(s) 1810 and other modules of the electronic system. The permanent storage device 1835, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1835.

Other embodiments use a removable storage device (such as a floppy disk, flash drive, etc.) as the permanent storage device. Like the permanent storage device 1835, the system memory 1825 is a read-and-write memory device. However, unlike storage device 1835, the system memory is a volatile read-and-write memory, such a random access memory. The system memory stores some of the instructions and data that the processor needs at runtime. In some embodiments, the invention's processes are stored in the system memory 1825, the permanent storage device 1835, and/or the read-only memory 1830. From these various memory units, the processing unit(s) 1810 retrieves instructions to execute and data to process in order to execute the processes of some embodiments.

The bus 1805 also connects to the input and output devices 1840 and 1845. The input devices enable the user to communicate information and select commands to the electronic system. The input devices 1840 include alphanumeric keyboards and pointing devices (also called "cursor control devices"). The output devices 1845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 18, bus 1805 also couples electronic system 1800 to a network 1865 through a network adapter (not shown). In this manner, the computer can be a part of a network of computers (such as a local area network ("LAN"), a wide area network ("WAN"), or an Intranet, or a network of networks, such as the Internet. Any or all components of electronic system 1800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6 and 14) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A network forwarding integrated circuit (IC) for processing network packets, the network forwarding IC comprising:
    a plurality of packet processing pipelines for receiving and processing packets, wherein each pipeline is configured to operate as an ingress pipeline and an egress pipeline, wherein each packet processing pipeline comprises:
        a parser configured to parse packets into packet header fields;
        a match-action unit configured to receive sets of the packet header fields from the parser and process the packet header fields through a series of match-action stages; and
        a deparser configured to receive modified sets of packet header fields from the match-action unit and reconstruct the packets after the match-action unit processing; and
    a traffic management circuit configured to receive packets processed by ingress pipelines and to enqueue the packets for output to egress pipelines based on the ingress pipeline processing,
    wherein a set of packets received by the network forwarding IC are processed by a first pipeline as an ingress pipeline and a second pipeline as an egress pipeline, then subsequently processed by the second pipeline as an ingress pipeline and a third pipeline as an egress pipeline.

2. The network forwarding IC of claim 1, wherein the first pipeline and the third pipeline are the same pipeline.

3. The network forwarding IC of claim 1, wherein the set of packets is a first set of packets, wherein a second set of packets are processed by the first pipeline as an ingress pipeline and the second pipeline as an egress pipeline and are subsequently transmitted to a network via a port associated with the second pipeline.

4. The network forwarding IC of claim 1, wherein the set of packets are sent to the second processing pipeline as an ingress pipeline via a loopback mechanism.

5. The network forwarding IC of claim 1, wherein layer 2 and layer 3 processing is performed by the match-action unit of the first ingress pipeline and thus not required to be performed by the match-action unit of the second ingress pipeline.

6. The network forwarding IC of claim 1, wherein the set of packets comprises stock market data packets, wherein for a particular packet, the first pipeline as an ingress pipeline identifies the packet as a stock market data packet and passes the identification to the traffic management circuit.

7. The network forwarding IC of claim 6, wherein the traffic management circuit replicates the packet to each of a plurality of ports associated with the second pipeline as an egress pipeline.

8. The network forwarding IC of claim 7, wherein the second pipeline as an egress pipeline operates in bypass mode, such that each replicated copy of the packet is looped back into the second pipeline as an ingress pipeline without processing by the second pipeline as an egress pipeline.

9. The network forwarding IC of claim 8, wherein the second pipeline as an ingress pipeline comprises a parser for each port, wherein each parser is configured to identify a different payload section of the packet and provide the identified payload section to a corresponding match-action unit of the second pipeline as an ingress pipeline.

10. The network forwarding IC of claim 9, wherein each match-action unit of the second pipeline as an ingress pipeline receives a particular payload section, identifies a different set of destinations for the replicated copy of the packet based on the particular payload section of the packet, and provides the identified set of destinations to the traffic management circuit with the replicated copy of the packet.

11. The network forwarding IC of claim 10, wherein the third pipeline as an egress pipeline receives each replicated copy of the packet and the set of destinations for the replicated copy and constructs a new packet having (i) a set of headers of the received market data packet and (ii) the particular payload section from which the set of destinations was identified.

12. The network forwarding IC of claim 11, wherein each new packet has only the particular payload section and not any of the other payload sections.

13. The method of claim 1, wherein the packet is a stock market data packet, wherein processing the packet using the first pipeline as an ingress pipeline comprises identifying the packet as a stock market data packet and passing the identification with the packet to the traffic management circuit.

14. The method of claim 13 further comprising replicating the packet to each of a plurality of ports associated with the second pipeline as an egress pipeline.

15. For a network forwarding IC comprising (i) a plurality of packet processing pipelines for receiving and processing packets that are each configured to operate as an ingress pipeline and as an egress pipeline and (ii) a traffic management circuit configured to receive packets processed by ingress pipelines and to enqueue the packets for output to a egress pipelines based on the ingress pipeline processing, a method comprising:

receiving a packet;

processing the packet using a first pipeline as an ingress pipeline and a second pipeline as an egress pipeline, wherein each packet processing pipeline comprises (i) a parser configured to parse packets into packet header fields, (ii) a match-action unit configured to receive sets of the packet header fields from the parser and process the packet header fields through a series of match-action stages, and (iii) a deparser configured to receive modified sets of packet header fields from the match-action unit and reconstruct the packets after the match-action unit processing; and subsequently processing the packet using the second pipeline as an ingress pipeline and a third pipeline as an egress pipeline.

16. The method of claim 15, wherein the first pipeline and the third pipeline are the same pipeline.

17. The method of claim 15 further comprising sending the packet to the second processing pipeline as an ingress pipeline via a loopback mechanism.

18. The method of claim 15, wherein layer 2 and layer 3 processing is performed by the match-action unit of the first ingress pipeline and thus not required to be performed by the match-action unit of the second ingress pipeline.

19. The method of claim 15, wherein the packet is a first packet, the method further comprising:

receiving a second packet;

processing the second packet using the first pipeline as an ingress pipeline and the second pipeline as an egress pipeline; and transmitting the second packet to a network via a port associated with the second pipeline.

* * * * *